US012710842B2

(12) United States Patent
Kim et al.

(10) Patent No.: US 12,710,842 B2
(45) Date of Patent: Aug. 18, 2026

(54) INPUT SENSING DEVICE AND DISPLAY DEVICE INCLUDING THE SAME

(71) Applicant: LG Display Co., Ltd., Seoul (KR)

(72) Inventors: Beomjin Kim, Paju-si (KR); Sojung Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/292,309

(22) Filed: Aug. 6, 2025

(65) Prior Publication Data

US 2026/0093356 A1 Apr. 2, 2026

(30) Foreign Application Priority Data

Sep. 27, 2024 (KR) ........................ 10-2024-0131830

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ........................... G06F 3/04166; G06F 3/0446
See application file for complete search history.

(56) References Cited

U.S. PATENT DOCUMENTS

2020/0210008 A1* 7/2020 Lee ....................... G06F 3/0412
2022/0206638 A1* 6/2022 Kim ...................... G06F 3/0448

FOREIGN PATENT DOCUMENTS

KR 101687185 B1 12/2016
KR 102222682 B1 3/2021

* cited by examiner

*Primary Examiner* — Afroza Chowdhury
(74) *Attorney, Agent, or Firm* — Seed Intellectual Property Law Group LLP

(57) ABSTRACT

The embodiments relate to an input sensing device and a display device including the same, wherein the input sensing device includes a plurality of analog front-end circuits configured to process touch sensing signals output from a plurality of touch electrodes to generate a sampling signal, and an analog-to-digital converter configured to convert the sampling signal to generate sensing data.

20 Claims, 13 Drawing Sheets

INPUT SENSING DEVICE AND DISPLAY DEVICE INCLUDING THE SAME

CROSS REFERENCE TO RELATED APPLICATION

The present application claims priority to Korean Patent Application No. 10-2024-0131830, filed on Sep. 27, 2024, the entire contents of which is incorporated herein for all purposes by this reference.

BACKGROUND

Technical Field

The present disclosure relates to an input sensing device and a display device including the same.

Description of the Related Art

With the development of the information society, various forms of display devices are being developed. Recently, various types of display devices such as liquid crystal display (LCD), plasma display panel (PDP), and organic light emitting display (OLED) are being utilized.

Recently, moving away from conventional input methods such as buttons, keyboards, and mice, display devices equipped with touch screen panels (TSPs), capable of detecting touch, hovering, and/or gesture inputs by a user's finger or a stylus pen, have come into widespread use.

These display devices include input sensing devices for detecting the presence of inputs and input coordinates (input position). The input sensing device drives the sensing electrodes arranged on the touch screen panel and processes the touch sensing signals output from the sensing electrodes through analog front-end circuits. Based on the amplified signals, the input sensing device detects input information such as input presence and/or input position.

BRIEF SUMMARY

The embodiments provide an input sensing device and a display device including the same, featuring a sample-and-hold circuit in the input sensing device that turns on only during the period required for touch sensing operation and turns off during the remaining period.

The embodiments provide an input sensing device and a display device including the same, featuring a sample-and-hold circuit in the input sensing device, where the reference current applied during touch sensing operation is variable.

An input sensing device according to an embodiment may include a plurality of analog front-end circuits configured to process touch sensing signals output from a plurality of touch electrodes to generate a sampling signal, and an analog-to-digital converter (ADC) configured to convert the sampling signal to generate sensing data.

Each of the plurality of analog front-end circuits may include a pre-amplifier configured to amplify the touch sensing signals and output an amplified signal, an integration circuit configured to integrate the amplified signal output from the pre-amplifier and generate an integrated signal, a sample-and-hold circuit configured to sample the integrated signal and generate the sampling signal, and a multiplexer circuit configured to electrically connect an output terminal of the sample-and-hold circuit and an input terminal of the ADC in response to a ADC input signal at a turn-on level.

The sample-and-hold circuit may control the amount of a reference current based on the ADC input signal.

The input sensing device may further include a controller configured to output a clock signal controlling the operation timing of the sample-and-hold circuit, an on-clock signal controlling the turn-on of the sample-and-hold circuit, and an ADC input signal, and an calculation unit configured to apply a driving control signal to the sample-and-hold circuit based on the on-clock signal and the ADC input signal.

The driving control signal may rise to a turn-on level in synchronization with the rising edge of the on-clock signal, and fall to a turn-off level in synchronization with the falling edge of the ADC input signal.

The reference current may be applied to the sample-and-hold circuit in response to the driving control signal at the turn-on level, and may be stopped from being applied to the sample-and-hold circuit in response to the driving control signal at the turn-off level.

During a touch sensing period, after the on-clock signal may be applied at the turn-on level, the clock signal may be applied at the turn-on level, and after the clock signal transitions to a turn-off level, the ADC input signal may be applied at a turn-on level.

The sample-and-hold circuit may be turned on in response to the driving control signal at the turn-on level, generate the sampling signal in response to the clock signal at the turn-on level, hold the sampling signal in response to the clock signal at the turn-off level, and output the sampling signal to the ADC in response to the ADC input signal at the turn-on level.

The calculation unit may include a flip-flop.

The flip-flop may include an input terminal configured to receive a low-level logic signal, a reset terminal configured to receive an inverted signal of the on-clock signal, a clock input terminal configured to receive an inverted signal of the ADC input signal; and an output terminal configured to output the driving control signal.

The flip-flop may output the driving control signal at a high-level at the output terminal in response to the inverted signal at a low-level of the on-clock signal being input to the reset terminal, and output the low-level logic signal at the output terminal in response to the inverted signal of the ADC input signal transitioning from low level to high level at the clock input terminal.

The sample-and-hold circuit may be turned on or turned off based on the ADC input signal, and may include at least one variable transistor configured to control the amount of the reference current.

The at least one variable transistor may receive a driving control signal at a turn-on level or a voltage at a turn-off level in response to the ADC input signal.

The sample-and-hold circuit may include an input section configured to receive the integrated signal and apply the reference current in response to the driving control signal, a control section including current mirrors configured to amplify the integrated signal based on the reference current, and an output section configured to output the sampling signal based on a current output from the control section.

The at least one variable transistor may be connected in parallel with at least one transistor in the input section or the control section.

The sample-and-hold circuit may further include a switching element connected in series with the at least one variable transistor and configured to turn on in response to the ADC input signal.

A display device according to an embodiment may include a touch panel including a plurality of touch electrodes arranged thereon, and a touch driving circuit configured to process touch sensing signals output from the plurality of touch electrodes to generate a sampling signal.

The touch driving circuit may include a plurality of analog front-end circuits configured to process the touch sensing signals output from the plurality of touch electrodes and generate the sampling signal, an analog-to-digital converter (ADC) configured to convert the sampling signal and generate sensing data; and a controller configured to control the operation timing of the plurality of analog front-end circuits.

Each of the plurality of analog front-end circuits may include a pre-amplifier configured to amplify the touch sensing signals and output an amplified signal, an integration circuit configured to integrate the amplified signal output from the pre-amplifier to generate an integrated signal, a sample-and-hold circuit configured to sample the integrated signal to generate the sampling signal, and a multiplexer circuit configured to electrically connect an output terminal of the sample-and-hold circuit and an input terminal of the ADC in response to a ADC input signal at a turn-on level.

The controller may output a clock signal controlling the operation timing of the sample-and-hold circuit, an on-clock signal controlling the turn-on of the sample-and-hold circuit, and the ADC input signal, and each of the plurality of analog front-end circuits may further include an calculation unit configured to apply a driving control signal to the sample-and-hold circuit based on the on-clock signal and the ADC input signal.

The driving control signal may rise to a turn-on level in synchronization with the rising edge of the on-clock signal, and fall to a turn-off level in synchronization with the falling edge of the ADC input signal.

The calculation unit may include a flip-flop.

The flip-flop may comprise an input terminal configured to receive a low-level logic signal, a reset terminal configured to receive an inverted signal of the on-clock signal, a clock input terminal configured to receive an inverted signal of the ADC input signal; and an output terminal configured to output the driving control signal.

The sample-and-hold circuit may include an input section configured to receive the integrated signal and apply a reference current in response to a driving control signal, a control section including current mirrors configured to amplify the integrated signal based on the reference current, an output section configured to output the sampling signal based on a current output from the control section, and at least one variable transistor connected in parallel with at least one transistor in the input section and the control section.

The at least one variable transistor may receive the driving control signal at the turn-on level or a voltage at the turn-off level in response to the ADC input signal.

The sample-and-hold circuit may further include a switching element connected in series with the at least one variable transistor and configured to turn on in response to the ADC input signal.

The ADC input signal may control the amount of a reference current, and the reference current may be applied to the sample-and-hold circuit in response to the driving control signal at the turn-on level, and may be stopped from being applied to the sample-and-hold circuit in response to the driving control signal at the turn-off level.

DETAILED DESCRIPTION

Figure 1:
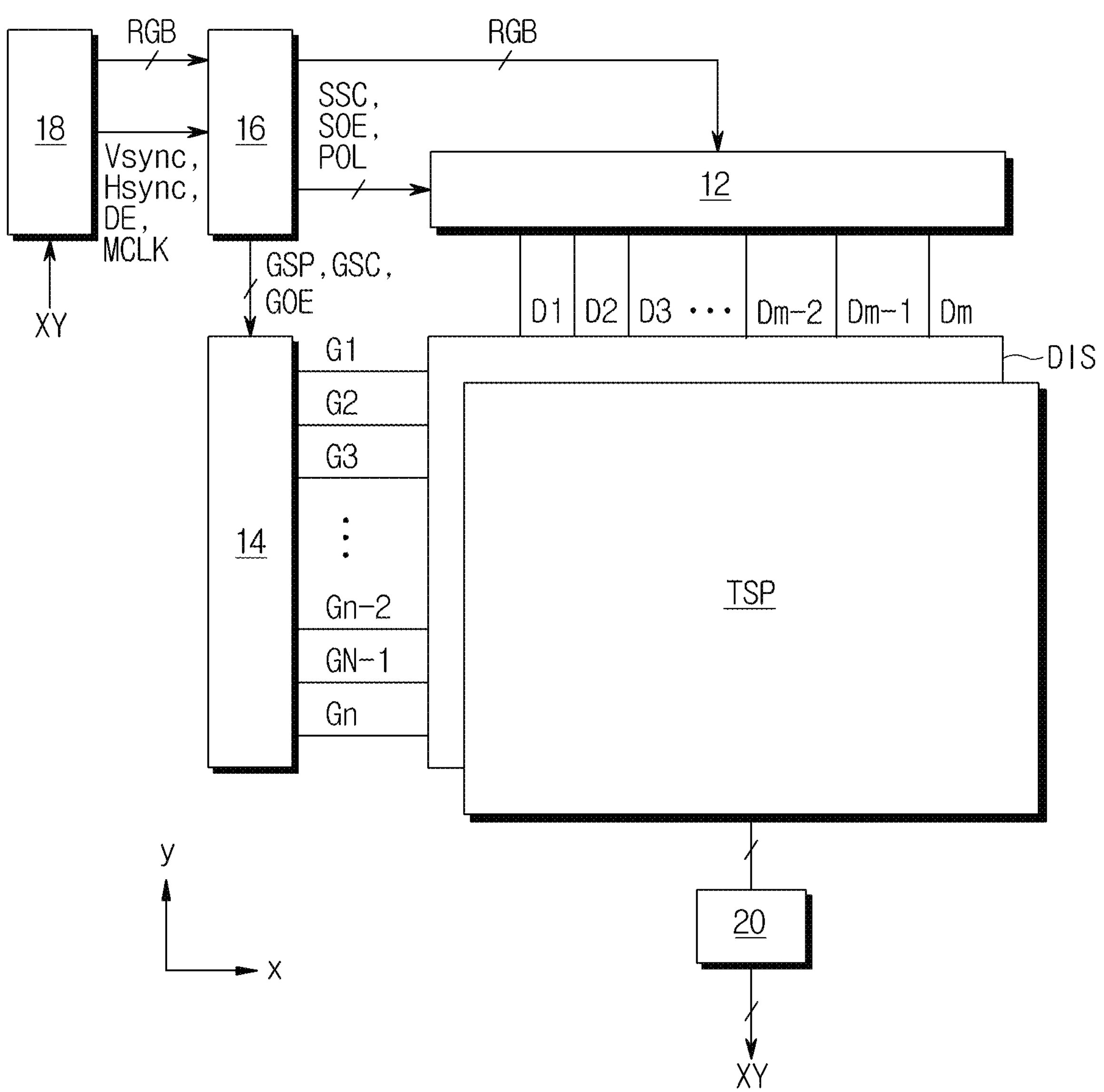
FIG. 1 is a block diagram illustrating a configuration of a display device according to an embodiment.

Hereinafter, embodiments will be described with reference to accompanying drawings. In the specification, when a component (or area, layer, part, etc.) is mentioned as being “on top of,” “connected to,” or “coupled to” another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression “and/or” is taken to include one or more combinations that can be defined by associated components.

The terms “first,” “second,” etc., are used to describe various components, but the components should not be limited by these terms. The terms are used only for distinguishing one component from another component. For example, a first component may be referred to as a second component and, similarly, the second component may be referred to as the first component, without departing from the scope of the present disclosure. The singular forms are intended to include the plural forms as well unless the context clearly indicates otherwise.

The terms such as “below,” “lower,” “above,” “upper,” etc., are used to describe the relationship of components depicted in the drawings. The terms are relative concepts and are described based on the direction indicated on the drawing.

It will be further understood that the terms “comprises,” “has,” and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a configuration of a display device according to an embodiment.

Referring to FIG. 1, the display device according to an embodiment may include a driving circuit and a display panel DIS.

The driving circuit is for controlling the emission of light from the pixels disposed on the display panel DIS and includes a data driving circuit 12, a scan driving circuit 14, and a timing controller 16.

The data driving circuit 12 converts the digital video data RGB output from the timing controller 16 into analog voltages, generating data voltages. The data driving circuit 12 provides the generated data voltages to the pixels of the display panel DIS through a plurality of data lines D1 to Dm.

The scan driving circuit 14 may sequentially supply gate pulses (or scan pulses) synchronized with the data voltages to the gate lines G1 to Gn.

The timing controller 16 controls the operating timing of the data driving circuit 12 and the scan driving circuit 14 based on timing signals such as vertical sync signal Vsync, horizontal sync signal Hsync, data enable signal DE, and main clock MCLK input from the host system 18.

The timing controller 16 generates data timing control signals based on the timing signals and applies them to the data driving circuit 12. The data timing control signals include source sampling clock SSC, polarity control signals POL, source output enable signals SOE, etc.

The timing controller 16 generates scan timing control signals based on the timing signals and applies them to the scan driving circuit 14. The scan timing control signals include gate start pulse GSP, gate shift clock GSC, and gate output enable signals GOE, etc.

The host system 18 may be a television, set-top box, navigation system, DVD player, Blu-ray player, personal computer PC, home theater, phone system, etc., but is not limited thereto. The host system 18 may include a System on Chip (SoC) with a scaler to convert the digital video data (RGB) of the input image into a format suitable for display on the display panel DIS. The host system 18 transmits the digital video data along with timing signals Vsync, Hsync, DE, and MCLK to the timing controller 16. Additionally, the host system 18 may execute an application associated with coordinate information XY received from the touch driving circuit 20.

The display panel DIS includes a plurality of pixels (also referred to as sub-pixels). The pixels, for example, may be arranged in a matrix form on the display panel DIS. Pixels arranged in a single pixel row are connected to the same gate line G1 to Gn, and pixels arranged in a single pixel column are connected to the same data line D1 to Dm. Pixels may emit light at a luminance corresponding to the gate pulses and data voltages supplied through the gate lines G1 to Gn and data lines D1 to Dm.

In an embodiment, each pixel may display one of the colors red, green, or blue. Alternatively, each pixel may display one of the colors cyan, magenta, or yellow. Alternatively, each pixel may display one of the colors red, green, blue, or white.

In an embodiment, the display device may include an input sensing device. The input sensing device may include a touch panel TSP and a touch driving circuit 20.

The touch panel TSP is disposed to overlap with the display panel DIS and may be configured as an external (Add-On) type attached on top of the display panel DIS or as an internal (In-Cell or On-Cell) type embedded between layers of the display panel DIS.

The touch panel TSP includes touch electrodes and touch lines connected to the touch electrodes. The touch electrodes are electrically connected to the touch driving circuit 20 via the touch lines. Each touch electrode receives a touch driving signal from the touch driving circuit 20 through its corresponding touch line and, in response, outputs a touch sensing signal to the touch driving circuit 20.

The touch driving circuit 20 senses changes in capacitance at the touch electrodes to determine whether a conductive material, such as a finger, has caused an input and to identify the input position. The touch driving circuit 20 applies the touch driving signal to the touch electrodes through the touch lines and receives the touch sensing signals output from the touch lines.

When it is determined, based on the touch sensing signal, that the capacitance change of the touch electrodes exceeds a threshold value, indicating that an input has occurred, the touch driving circuit 20 transmits a sensing data, including the input's coordinate information (XY), to the host system 18.

The touch driving circuit 20 may be implemented independently or integrated with the data driving circuit 12 in one or more integrated circuits.

In an embodiment, the display device may be a rigid display device or a flexible display device. For example, the display device may be a foldable display device, a bendable display device, a rollable display device, or a stretchable display device.

Figure 2:
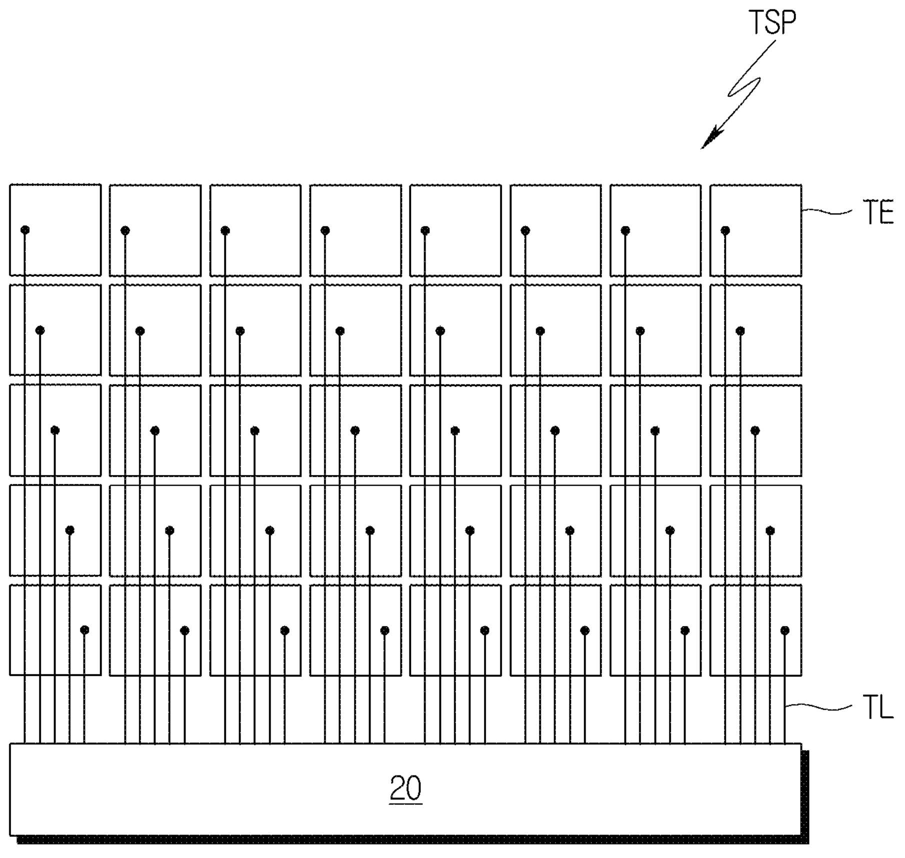
FIG. 2 is a diagram illustrating the configuration of an input sensing device according to an embodiment.

FIG. 2 is a diagram illustrating the configuration of an input sensing device according to one embodiment.

In the embodiment of FIG. 2, the input sensing device may provide a self-capacitance-based touch sensing function that detects touch input by measuring the capacitance or changes in capacitance formed at each touch electrode TE. In this embodiment, the input sensing device may include a touch panel TSP and a touch driving circuit 20.

The touch panel TSP may have multiple touch electrodes TE. Each touch electrode TE may receive a touch driving signal and output a touch sensing signal. Each of the multiple touch electrodes TE may be electrically connected to the touch driving circuit 20 via one or more touch lines TL.

The area where a touch electrode TE is formed may correspond to or be larger than the area where a pixel is formed. For example, a single touch electrode TE may be formed to overlap with two or more pixels. However, this embodiment is not limited thereto.

Meanwhile, FIG. 2 exemplifies a self-capacitance-based touch panel TSP that detects touch input by measuring the capacitance or changes in capacitance formed at each touch electrode TE. However, this embodiment is not limited thereto. In various other embodiments, the touch panel TSP may provide a mutual-capacitance-based touch sensing function, which detects touch input by measuring the capacitance or changes in capacitance formed between two types of touch electrodes (e.g., Tx and Rx electrodes).

The touch driving circuit 20 is electrically connected to the touch electrodes TE via the touch lines TL. During a touch driving period in which touch sensing is performed, the touch driving circuit 20 may supply a touch driving signal to the touch panel TSP. The touch driving signal may take various forms, such as a square-wave pulse, a sine wave, or a triangular wave. The touch driving circuit 20 may determine the presence and/or position of a touch input based on the touch sensing signals received (or detected) from the touch electrodes TE in response to the touch driving signal.

The touch driving circuit 20 may divide a plurality of touch electrodes TE into several groups and sense each group as a single sensing unit. During touch sensing operation, the touch driving circuit 20 may sense the touch electrodes TE included in one sensing unit and receive the touch sensing signal.

A single sensing unit may consist, for example, of one or more rows of touch electrodes, one or more columns of touch electrodes, or touch electrodes TE arranged in a polygonal shape such as a square or rectangle. However, the embodiment is not thereto.

The touch driving circuit 20 may sense one or more sensing units during a single touch sensing operation. Additionally, the touch driving circuit 20 may sense the sensing units sequentially or non-sequentially. For example, the touch driving circuit 20 may sense one sensing unit at a time or simultaneously sense two or more sensing units.

In an embodiment, the touch driving circuit 20 may be configured to apply a predetermined voltage, e.g., a common voltage, to the touch electrodes TE during the display driving period when an image is displayed through pixels. Applying a stable DC voltage to the touch electrodes TE may prevent noise generation in the touch electrodes TE on the display panel DIS during the display driving period.

The driving method of the input sensing device using the touch driving circuit 20 is described in detail below.

Figure 3:
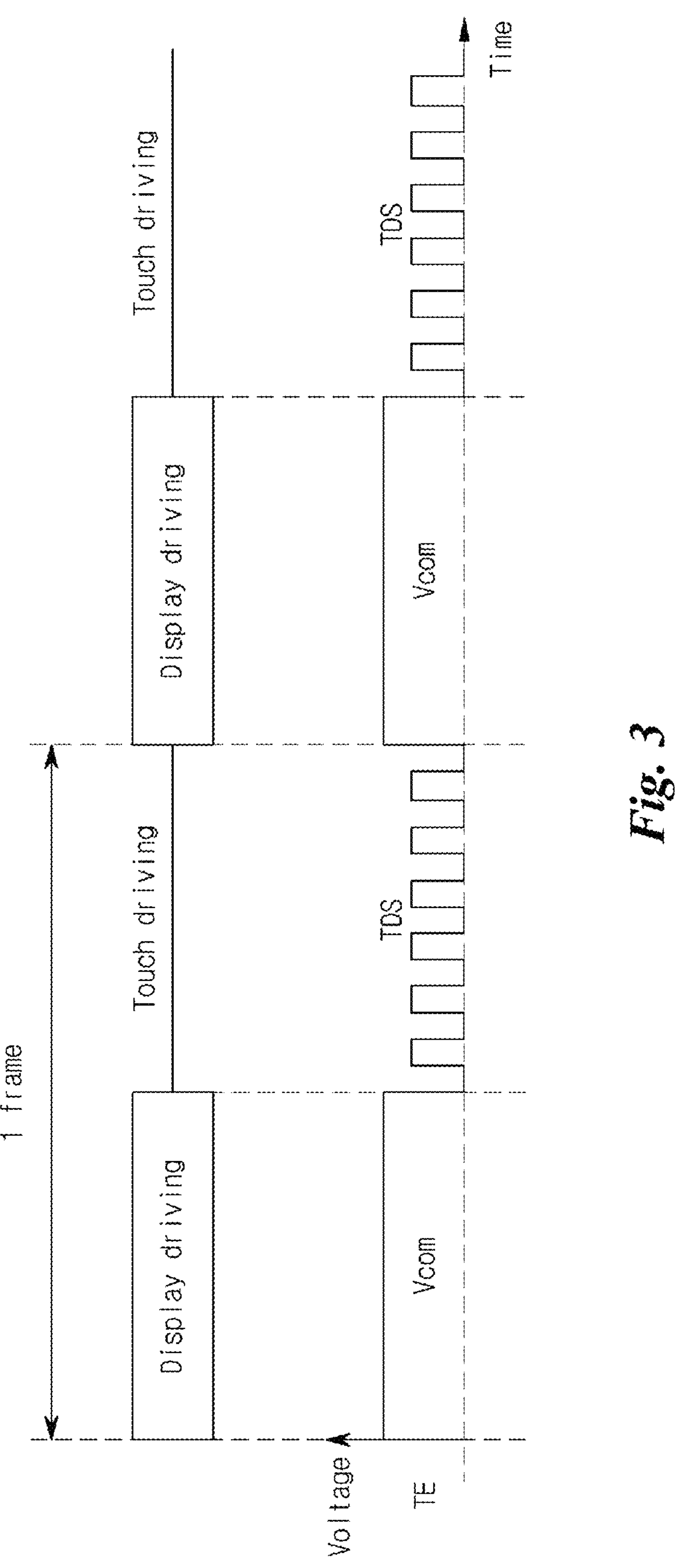
FIG. 3 is a timing diagram illustrating the driving signals of the touch panel shown in FIG. 2.

FIG. 3 is a timing diagram illustrating the driving signals of the touch panel shown in FIG. 2.

Referring to FIG. 3, a frame for driving the display device according to an embodiment may include a display driving period and a touch driving period. The display driving period and the touch driving period may be time-divisioned within a frame.

Referring to FIGS. 2 and 3 together, during the display driving period, the touch driving circuit 20 may apply a common voltage Vcom to all touch electrodes TE through all touch lines TL.

During the touch driving period following the display driving period, the touch driving circuit 20 may apply a touch driving signal TDS to the touch electrodes TE through the touch lines TL. As illustrated, the touch driving signal TDS may be a pulse signal in the form of a square wave, but is not limited thereto and may have various forms such as a sine wave or a triangular wave.

The touch driving circuit 20 may be connected to the touch electrodes TE through the touch lines TL and may be configured to selectively apply either the common voltage Vcom or the touch driving signal TDS to the touch electrodes TE. For this purpose, the touch driving circuit 20 may include at least one switching element and/or logic element.

Figure 4:
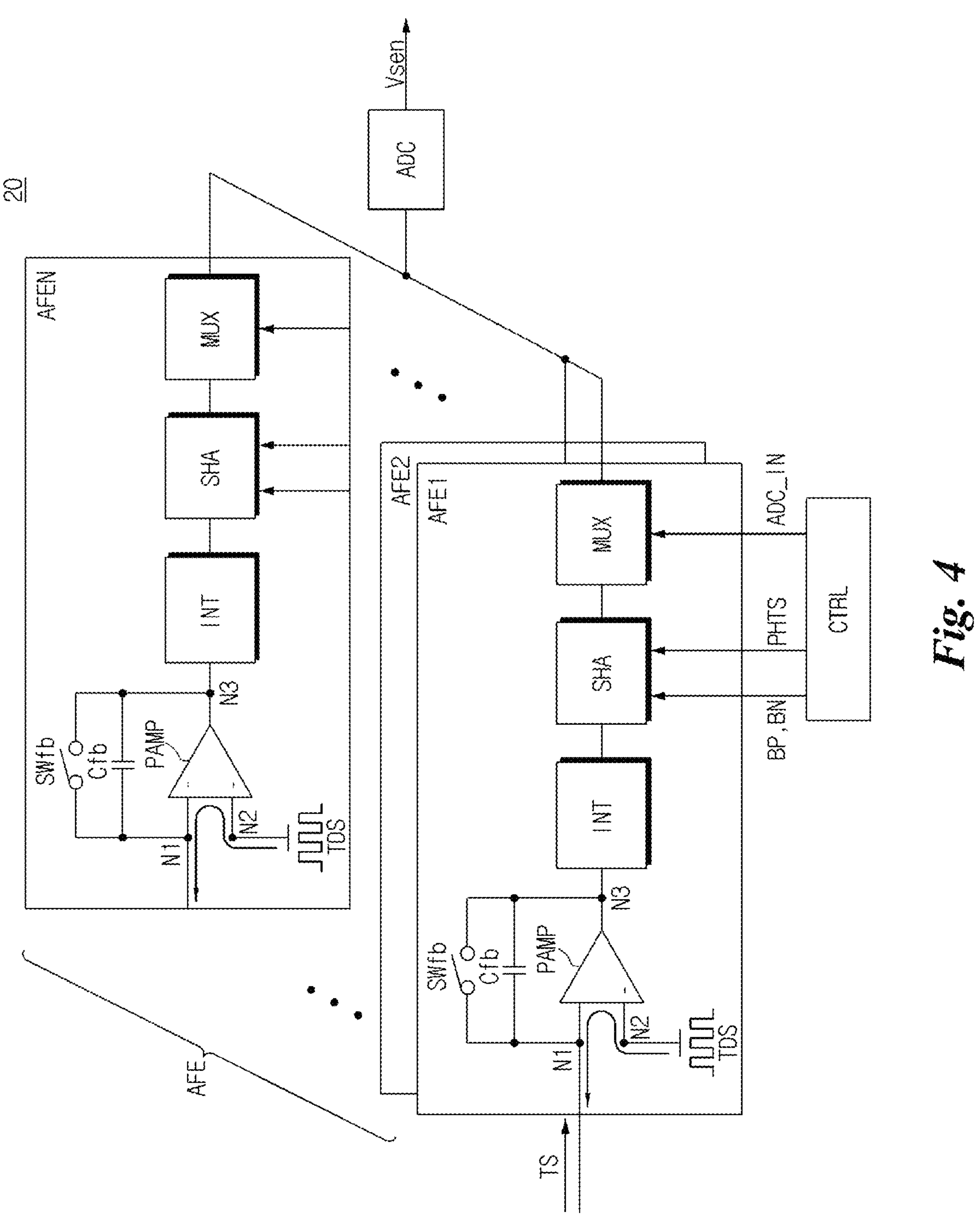
FIG. 4 is a block diagram illustrating the configuration of a touch driving circuit according to the first embodiment.

FIG. 4 is a block diagram illustrating the configuration of a touch driving circuit according to the first embodiment.

Referring to FIG. 4, the touch driving circuit 20 according to an embodiment may include an analog front-end circuit AFE and an analog-to-digital converter ADC. The analog front-end circuit AFE may be provided in multiple instances corresponding to one or more sensing units, and the analog-to-digital converter ADC may be connected to one or more analog front-end circuits AFE. That is, a single analog-to-digital converter ADC may be shared between two or more analog front-end circuits AFE.

The analog front-end circuit AFE processes the touch sensing signal TS output from the touch electrode TE (FIG. 2) to generate and output a sampling signal. Each analog front-end circuit AFE may include a preamplifier PAMP, an integration circuit INT, a sample-and-hold circuit SHA, and a multiplexer circuit MUX.

The preamplifier PAMP may amplify the input touch sensing signal TS and output an amplified signal. The preamplifier PAMP may include a first input terminal N1, a second input terminal N2, and an output terminal N3. A terminal generally refers to a configuration used to connect electrodes to the input or output of a circuit. For example, a terminal may be implemented as a pin or similar component.

The first input terminal N1 of the preamplifier PAMP receives the touch sensing signal TS. The second input terminal N2 of the preamplifier PAMP receives a reference signal. The first input terminal N1 of the preamplifier PAMP may be the inverting input terminal (−). The second input terminal N2 of the preamplifier PAMP may be the non-inverting input terminal (+). The reference signal may be, for example, the touch driving signal TDS.

The preamplifier PAMP amplifies the voltage difference between the first input terminal N1 and the second input terminal N2 and outputs the amplified voltage difference to the output terminal N3. Here, the characteristics (e.g., magnitude) of the signal output from the output terminal N3 of the preamplifier PAMP may correspond to the capacitance change of the touch electrode TE (FIG. 2) caused by a touch input object (e.g., a finger, pen, etc.).

In an embodiment, each analog front-end circuit AFE may include a feedback capacitor Cfb, which is electrically connected between the first input terminal N1 and the output terminal N3 of the preamplifier PAMP. The feedback capacitor Cfb includes one end electrically connected to the first input terminal N1 of the preamplifier PAMP and the other end electrically connected to the output terminal N3 of the preamplifier PAMP. The feedback capacitor Cfb may be charged to a value corresponding to the voltage difference between the touch sensing signal TS input to the first input terminal N1 of the preamplifier PAMP and the touch driving signal TDS.

In an embodiment, each analog front-end circuit AFE may include a feedback switch SWfb that switches the electrical connection between the first input terminal N1 and the output terminal N3 of the preamplifier PAMP. The charging and discharging of the feedback capacitor Cfb may be controlled according to the operation of the feedback switch SWfb.

Meanwhile, the touch driving signal TDS input to the second input terminal N2 of the preamplifier PAMP may be applied to the touch electrodes TE (FIG. 2). Accordingly, the touch driving signal TDS may be applied to one or more touch electrodes TE that form the sensing unit.

The integration circuit INT receives the signal output from the output terminal N3 of the preamplifier PAMP. The integration circuit INT integrates the voltage or current output from the output terminal N3 of the preamplifier PAMP for a predetermined number of integration cycles and outputs an integrated signal.

The sample-and-hold circuit SHA samples the integrated signal output from the integration circuit INT to generate a sampling signal and holds the generated sampling signal. The sample-and-hold circuit SHA may receive a clock signal PHTS (per horizontal time signal), drive control signals BN, BP, and the ADC input signal ADC_IN provided by the controller CTRL to generate the sampling signal.

The clock signal PHTS may be provided during the touch sensing operation to define each touch sensing period and may be a predetermined square wave pulse signal. For example, one touch sensing period may be defined by the interval between the rising edge (or falling edge) of two adjacent pulses. The operation timing of the sample-and-hold circuit SHA may be controlled by this clock signal PHTS. While the clock signal PHTS is applied at the turn-on level, the sample-and-hold circuit SHA may sample the input integrated signal and generate a sampling signal. After the clock signal PHTS is turned off, the sampling signal may be held in the sample-and-hold circuit SHA until the ADC input signal ADC_IN is applied at the turn-on level.

The drive control signals BN and BP are used to control the turn-on and turn-off of the transistors constituting the sample-and-hold circuit SHA, and may include an N-type control signal BN for controlling N-type transistors and a P-type control signal BP for controlling P-type transistors. The N-type control signal BN may have, for example, a high-level turn-on voltage and a low-level turn-off voltage. The P-type control signal BP may have, for example, a low-level turn-on voltage and a high-level turn-off voltage.

The multiplexer circuit MUX is connected between the output terminal of the sample-and-hold circuit SHA and the input terminal of the analog-to-digital converter ADC. The multiplexer circuit MUX may receive the ADC input signal ADC_IN provided by the controller CTRL. When the ADC input signal ADC_IN is applied at the turn-on level, the multiplexer circuit MUX may electrically connect the output terminal of the sample-and-hold circuit SHA and the input terminal of the analog-to-digital converter ADC. Accordingly, while the ADC input signal ADC_IN is applied at the turn-on level, the sampled signal held in the sample-and-hold circuit SHA may be input into the analog-to-digital converter ADC. When the ADC input signal ADC_IN is applied at the turn-off level, the multiplexer circuit MUX may electrically disconnect the output terminal of the sample-and-hold circuit SHA and the input terminal of the analog-to-digital converter ADC.

The analog-to-digital converter ADC sequentially loads the sampled signals held in each sample-and-hold circuit SHA and converts the integral signals to digital format to generate raw data. The analog-to-digital converter ADC may transmit the raw data to the controller CTRL.

The controller CTRL compares the raw data with a predetermined threshold value and determines the positions of the touch electrodes TE with capacitance changes above the threshold value as the touch input area. The controller CTRL calculates coordinates for each touch input and may transmit the sensing data, including the coordinate information, to the host system 18 (FIG. 1).

Figure 5:
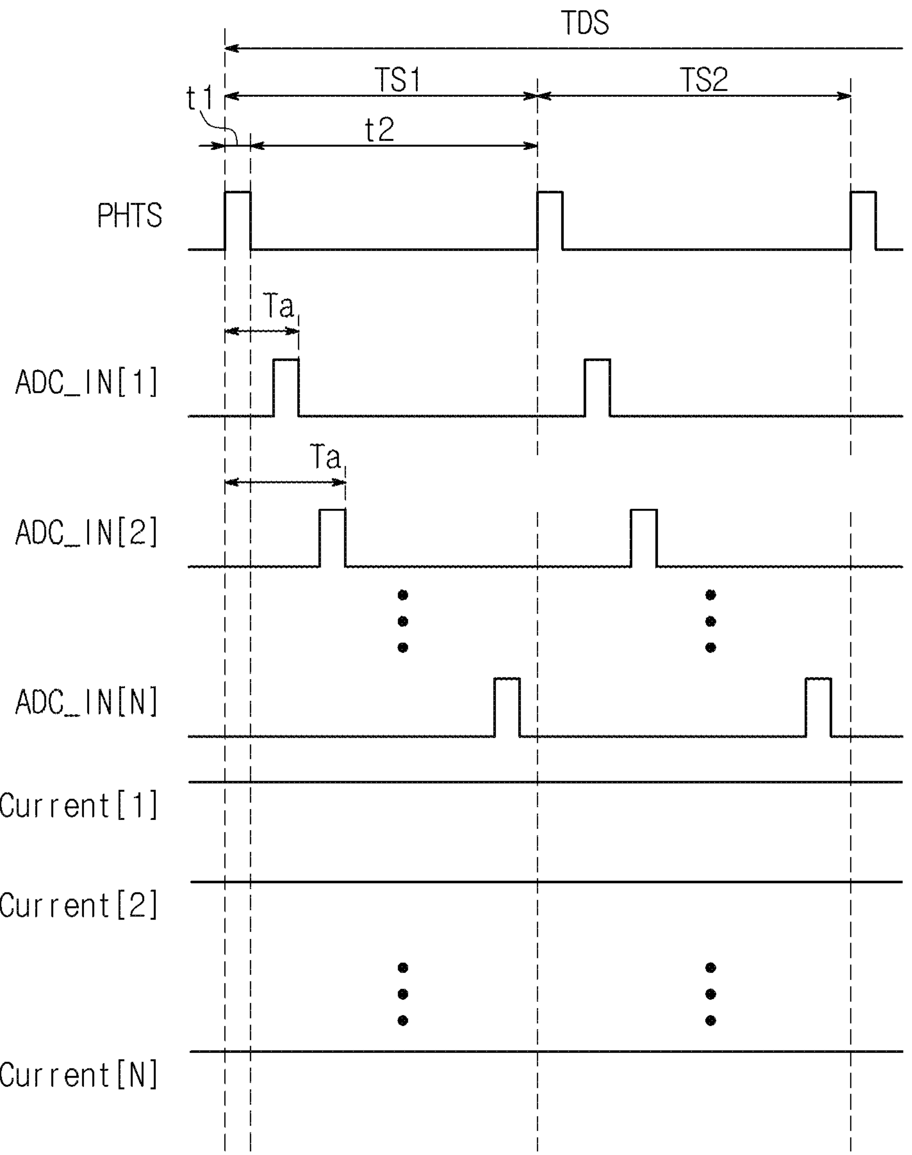
FIG. 5 is a timing diagram illustrating the input and output signals generated in the touch driving circuit of FIG. 4.

FIG. 5 is a timing diagram illustrating the input and output signals generated in the touch driving circuit of FIG. 4.

Referring to FIGS. 4 and 5, during the touch sensing driving TSD, one or more touch sensing periods TS1 and TS2 may be performed. Touch sensing may be performed for the sensing units corresponding to each touch sensing period (TS1 and TS2).

During the first period t1 of each touch sensing period (TS1 and TS2), a clock signal PHTS at the turn-on level may be output from the controller CTRL.

The sample-and-hold circuit SHA of the analog front-end circuits AFE may initiate sampling in response to the pulse of the clock signal PHTS and process the touch sensing signal TS input from the touch electrodes TE (FIG. 2) to generate the sampling signal. After the first period t1, the analog front-end circuits AFE may hold the generated sampling signal.

Then, during the second period t2, the controller CTRL may sequentially apply turn-on level ADC input signals ADC_IN to the analog front-end circuits AFE. For example, the controller CTRL may apply the first ADC input signal ADC_IN[1] to the first analog front-end circuit AFE1, then the second ADC input signal ADC_IN[2] to the second analog front-end circuit AFE2, and finally the Nth ADC input signal ADC_IN[N] to the Nth analog front-end circuit AFEN.

As a result, the sampling signals from the analog front-end circuits AFE may be output sequentially. The sampling signals output from the analog front-end circuits AFE may be converted to sensing data Vsen by the analog-to-digital converter ADC.

The analog front-end circuits AFE may be driven based on a current (Current[1] to Current[N]) of a specified magnitude required for operation during touch sensing driving TDS. This current (Current[1] to Current[N]) may be generated based on an externally applied reference current. Specifically, the sample-and-hold circuits SHA within the analog front-end circuits AFE may be driven using a current (Current[1] to Current[N]) of microampere (uA) magnitude during touch sensing driving TDS. The power consumed by the sample-and-hold circuit SHA may be proportional to the magnitude of this driving current (Current[1] to Current[N]).

In the above embodiment, the sample-and-hold circuit SHA in each of the analog front-end circuits AFE operates effectively from the time the sampling is initiated by the clock signal PHTS until the integral signal is output by the ADC input signal ADC_IN (Ta). That is, after providing the sampling signal to the analog-to-digital converter ADC, the sample-and-hold circuit SHA may operate in a substantially inactive state until the next clock signal PHTS is used to sample the sensing signal.

In this embodiment, driving the sample-and-hold circuit SHA in an active or turn-on state while the analog front-end circuit AFE is inactive is unnecessary, which results in excessive power consumption and accelerates the degradation of the components of the circuit, thereby reducing its lifespan.

Moreover, in this embodiment, when the analog-to-digital converter ADC is connected by the multiplexer circuit MUX, the load on the analog front-end circuits AFE reaches its maximum. To ensure that the analog front-end circuits AFE may operate without performance degradation under maximum load, the output performance of the sample-and-hold circuit SHA may be determined assuming the maximum load. However, when the analog-to-digital converter ADC is not connected, the load on the analog front-end circuits AFE decreases, causing the output performance of the sample-and-hold circuit SHA to become excessive. In this case, since the sample-and-hold circuit SHA operates with excessive output performance for most of the activation period, it accelerates power consumption and shortens lifespan.

Figure 6:
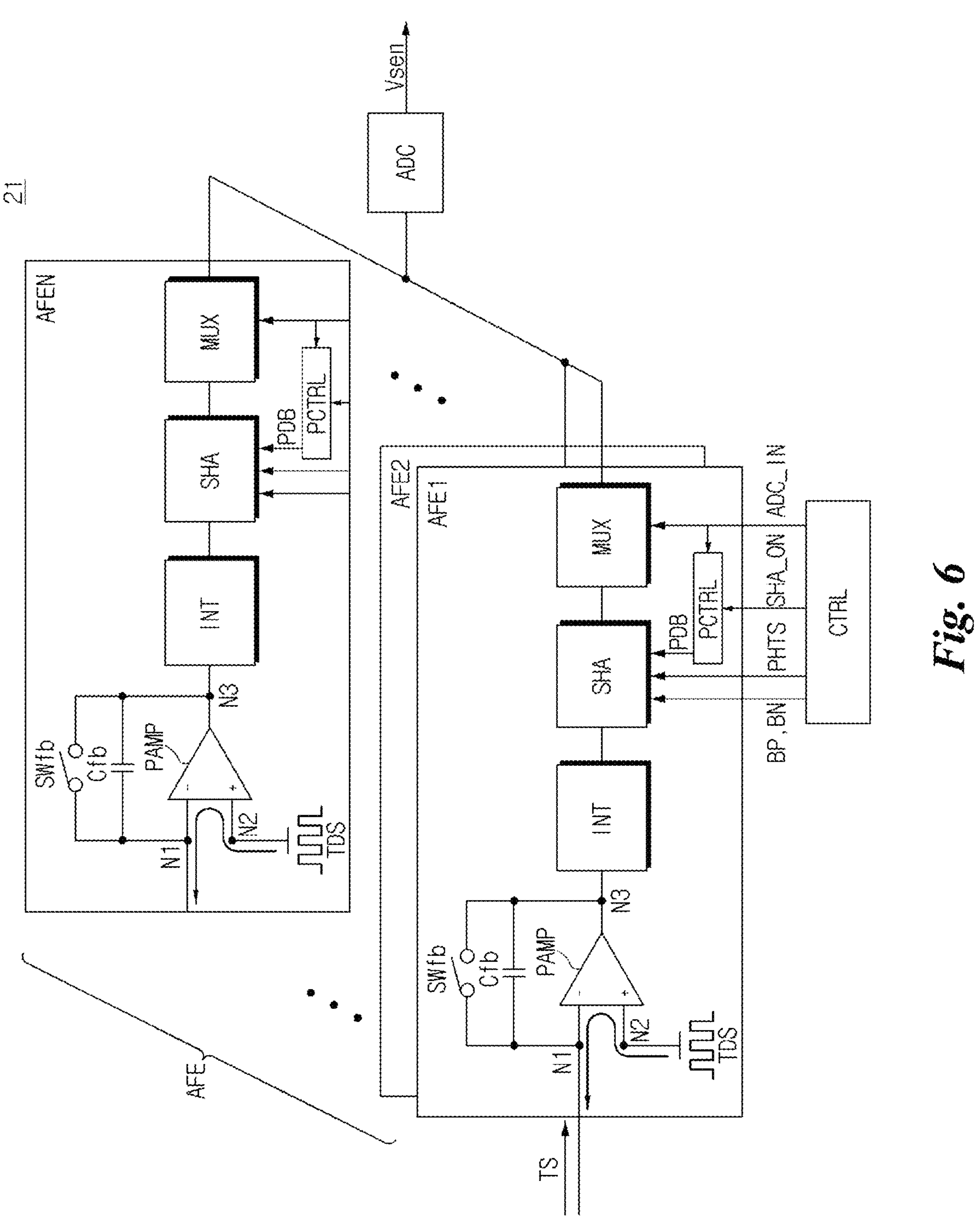
FIG. 6 is a block diagram illustrating the configuration of a touch driving circuit according to the second embodiment.

FIG. 6 is a block diagram illustrating the configuration of a touch driving circuit according to the second embodiment.

Referring to FIG. 6, the touch driving circuit 21 according to the second embodiment further includes an calculation unit PCTRL.

The calculation unit PCTRL receives an on-clock signal SHA_ON from the controller CTRL and may receive an ADC input signal ADC_IN provided by the multiplexer circuit MUX.

The on-clock signal SHA_ON is applied to turn on the sample-and-hold circuit SHA and may be a predetermined square wave pulse signal. Within a single touch sensing period, the turn-on period of the on-clock signal SHA_ON may precede the turn-on period of the clock signal PHTS. That is, after the pulse of the on-clock signal SHA_ON is applied to the calculation unit PCTRL, the pulse of the clock signal PHTS may be applied to the sample-and-hold circuit SHA. The controller CTRL may first turn on the on-clock signal SHA_ON to activate the sample-and-hold circuit SHA before turning on the clock signal PHTS.

The ADC input signal ADC_IN may be applied to the multiplexer circuit MUX to define the timing at which the sampling signal is output from the sample-and-hold circuit SHA to the analog-to-digital converter ADC. The ADC input signal ADC_IN may be turned on after the clock signal PHTS is turned off and a predetermined time has passed. When the ADC input signal ADC_IN is turned on, the sampling signal held in the sample-and-hold circuit SHA may be output to the ADC.

The calculation unit PCTRL, based on the on-clock signal SHA_ON and the ADC input signal ADC_IN, may output a drive control signal (Per down inverse signal, PDB) to turn on (activate) or turn off (deactivate) the sample-and-hold circuit SHA. That is, when the on-clock signal SHA_ON is turned on, the calculation unit PCTRL may output a turn-on level drive control signal PDB to the sample-and-hold circuit SHA to turn it on. The calculation unit PCTRL may apply a turn-off level drive control signal PDB to the sample-and-hold circuit SHA to turn it off when the ADC input signal ADC_IN is turned off. In other words, the drive control signal PDB may be controlled to turn on in synchronization with the turn-on edge of the on-clock signal SHA_ON, and turn off in synchronization with the turn-off edge of the ADC input signal ADC_IN.

To generate such a drive control signal PDB, the calculation unit PCTRL may be configured with at least one level-trigger circuit, such as a level-trigger flip-flop circuit. The specific configuration of the calculation unit PCTRL will be explained later with reference to FIG. 8.

Figure 7:
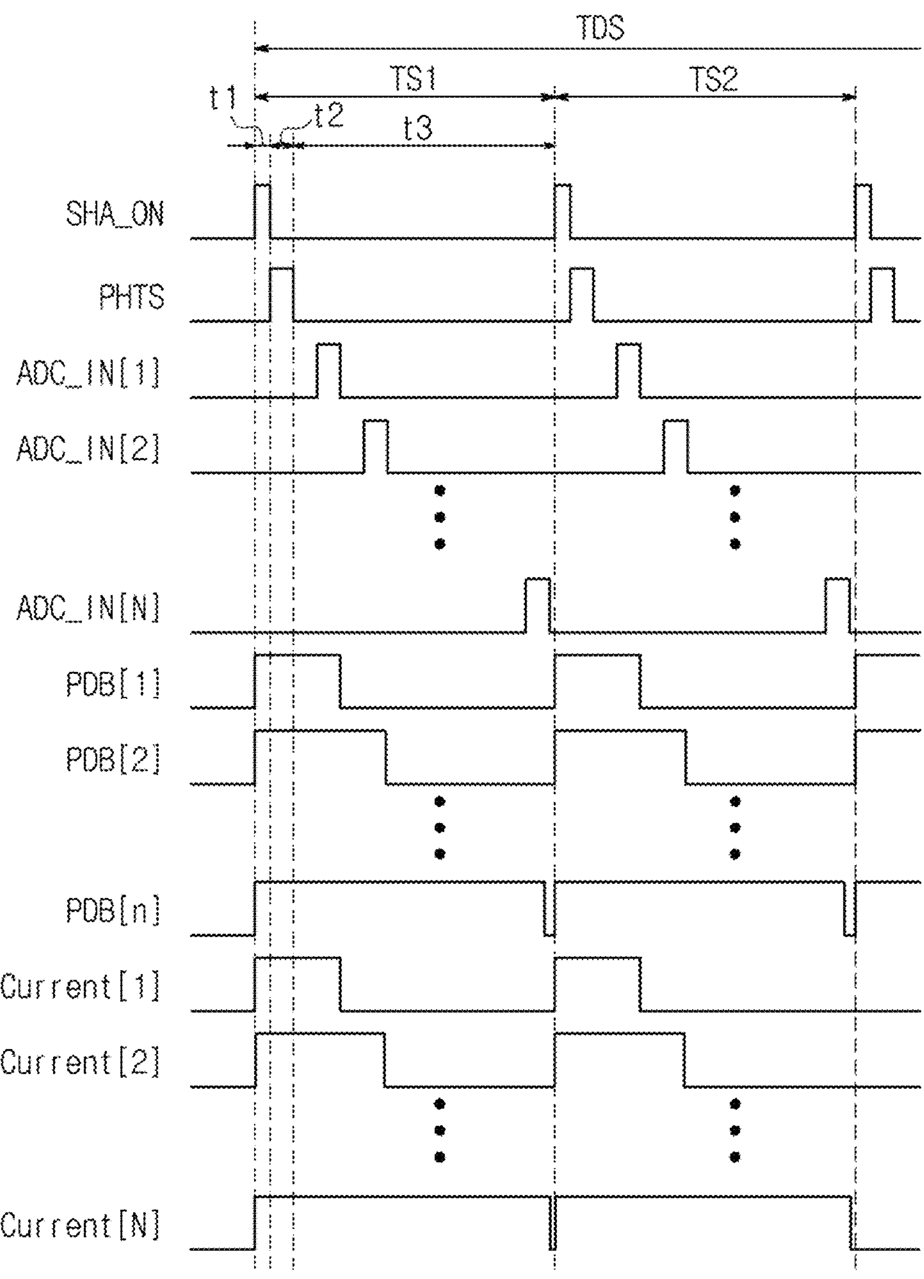
FIG. 7 is a timing diagram illustrating the input and output signals generated in the touch driving circuit of FIG. 6.

FIG. 7 is a timing diagram illustrating the input and output signals generated in the touch driving circuit of FIG. 6.

Referring to FIGS. 6 and 7, during the touch sensing driving TSD, one or more touch sensing periods TS1 and TS2 may be performed. Touch sensing may be performed for the sensing units corresponding to each touch sensing period (TS1 and TS2).

During the first period t1 of each touch sensing period (TS1 and TS2), a turn-on level on-clock signal SHA_ON may be output from the controller CTRL. The calculation unit PCTRL may synchronize with the rising edge of the on-clock signal SHA_ON to turn on (rise) all drive control signals PDB.

The sample-and-hold circuit SHA may be turned on in response to the turn-on level drive control signal PDB. For example, in response to the drive control signal PDB, the drive control signal at a turn-on level may be applied to the sample-and-hold circuit SHA, and in response to the driving control signal, a reference current with a constant value may also be applied to the sample-and-hold circuit SHA. The sample-and-hold circuit SHA may be driven in response to the drive currents Current1 to CurrentN.

Then, during the second period t2, a clock signal PHTS at the turn-on level may be output from the controller CTRL.

The sample-and-hold circuit SHA of the analog front-end circuits AFE may initiate sampling in response to the pulse of the clock signal PHTS and process the sensing signal input from the touch electrodes TE (FIG. 2) to generate the sampling signal. After the first period t2, the analog front-end circuits AFE may hold the generated sampling signal.

Then, during the second period t3, the controller CTRL may sequentially apply turn-on level ADC input signals ADC_IN to the analog front-end circuits AFE. For example, the controller CTRL may apply the first ADC input signal ADC_IN[1] to the first analog front-end circuit AFE1, then the second ADC input signal ADC_IN[2] to the second analog front-end circuit AFE2, and finally the Nth ADC input signal ADC_IN[N] to the Nth analog front-end circuit AFEN.

As a result, the sampling signals from the analog front-end circuits AFE may be output sequentially. The sampling signals output from the analog front-end circuits AFE may be converted to sensing data Vsen by the analog-to-digital converter ADC.

During the third period t3, the calculation unit PCTRL may, in synchronization with the falling edge of the ADC input signal ADC_IN, turn off (falling) the drive control signal PDB. For example, the calculation unit PCTRL may synchronize with the falling edge of the first ADC input signal ADC_IN[1] to switch the first power control signal PDB [1] applied to the sample-and-hold circuit SHA of the first analog front-end circuit AFE1 to the turn-off level, synchronize with the falling edge of the second ADC input signal ADC_IN[2] to switch the second power control signal PDB [2] applied to the sample-and-hold circuit SHA of the second analog front-end circuit AFE2 to the turn-off level, and synchronize with the falling edge of the N-th ADC input signal ADC_IN[N] to switch the N-th power control signal PDB [N] applied to the sample-and-hold circuit SHA of the N-th analog front-end circuit AFEN to the turn-off level.

The sample-and-hold circuit SHA may turn off in response to the turn-off level drive control signal PDB. For example, in response to the drive control signal PDB, the drive control signal may be applied to the sample-and-hold circuit SHA at the turn-off level, and in response to the drive control signal, the application of the reference current, which is a constant current, to the sample-and-hold circuit SHA may be discontinued. The sample-and-hold circuit SHA may stop functioning as the supply of the drive currents Current1 to CurrentN is interrupted.

As such, each sample-and-hold circuit SHA outputs the sampling signal to the analog-to-digital converter ADC during the turn-on period of the ADC input signal ADC_IN and may sequentially turn off in response to the turn-off level of the drive control signal PDB.

The sample-and-hold circuit SHA is turned on when instructed by the on-clock signal SHA_ON and, thereafter, may perform sampling and hold operations according to the clock signal PHTS that is subsequently provided. Furthermore, the sample-and-hold circuit SHA may turn off after providing the sampling circuit to the analog-to-digital converter ADC in response to the ADC input signal ADC_IN. That is, the sample-and-hold circuit SHA is turned on (with the drive current applied) during the period in which it must operate, and turned off (with the drive current not applied) during the remaining period, thus reducing power consumption.

Figure 8:
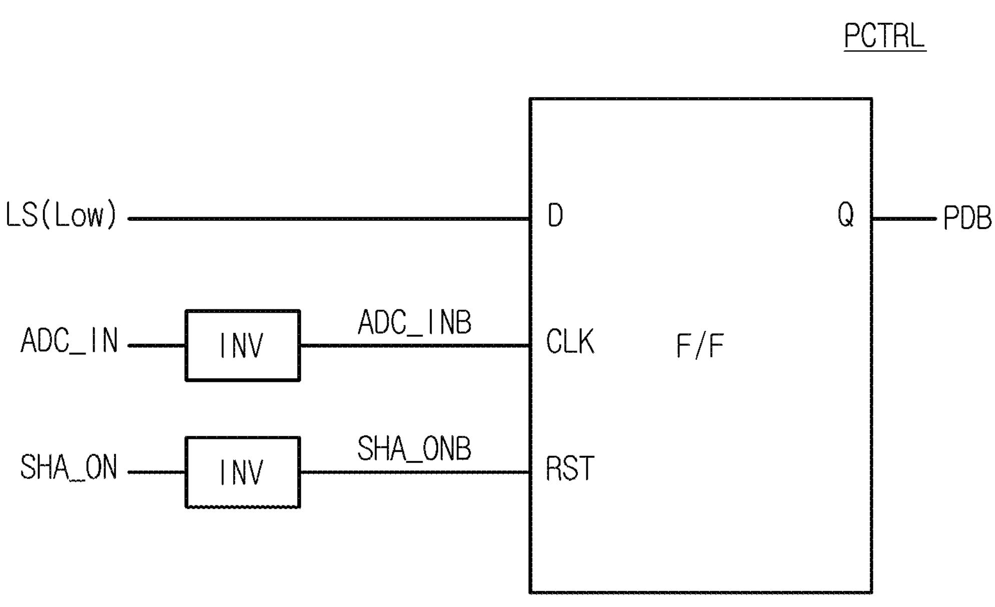
FIG. 8 is a diagram illustrating the configuration of a power controller according to a embodiment.

FIG. 8 is a diagram illustrating the configuration of a power controller according to an embodiment.

Referring to FIG. 8, the calculation unit PCTRL according to an embodiment may include at least one flip-flop. The flip-flop may, for example, use the ADC input signal ADC_IN as the clock and receive predetermined logic signals and the on-clock signal SHA_ON to perform logical operations, but this is not limiting.

The flip-flop may include an input terminal D, a reset terminal RST, and a clock input terminal CLK. The flip-flop, as an edge trigger, may output the logic signal input to the first input terminal D to the output terminal Q when the signal input to the clock input terminal CLK transitions to a high level.

The input terminal D of the flip-flop may receive a predetermined logic signal LS. The logic signal LS may, for example, be a low-level logic signal.

The reset terminal RST of the flip-flop may receive the inverted signal SHA_ONB of the on-clock signal SHA_ON. To do this, the reset terminal RST of the flip-flop may be configured to receive the on-clock signal SHA_ON through a logic inverter element INV, such as a NOT gate. The flip-flop may output a high-level logic signal to the output terminal Q when a low-level inverted signal SHA_ONB is input to the reset terminal RST, regardless of the signal level applied to the clock input terminal CLK, which will be described later.

The clock input terminal CLK of the flip-flop may receive the inverted signal ADC_INB of the ADC input signal ADC_IN. To do this, the clock input terminal CLK of the flip-flop may be configured to receive the ADC input signal ADC_IN through the logic inverter element INV, such as a NOT gate. The flip-flop may output a low-level logic signal from the input terminal D to the output terminal Q at the rising edge when the inverted signal ADC_INB received at the clock input terminal CLK transitions to a high level.

The logic signal output at the output terminal Q may serve as the drive control signal PDB and be applied to the sample-and-hold circuit SHA (see FIG. 7).

Figure 9:
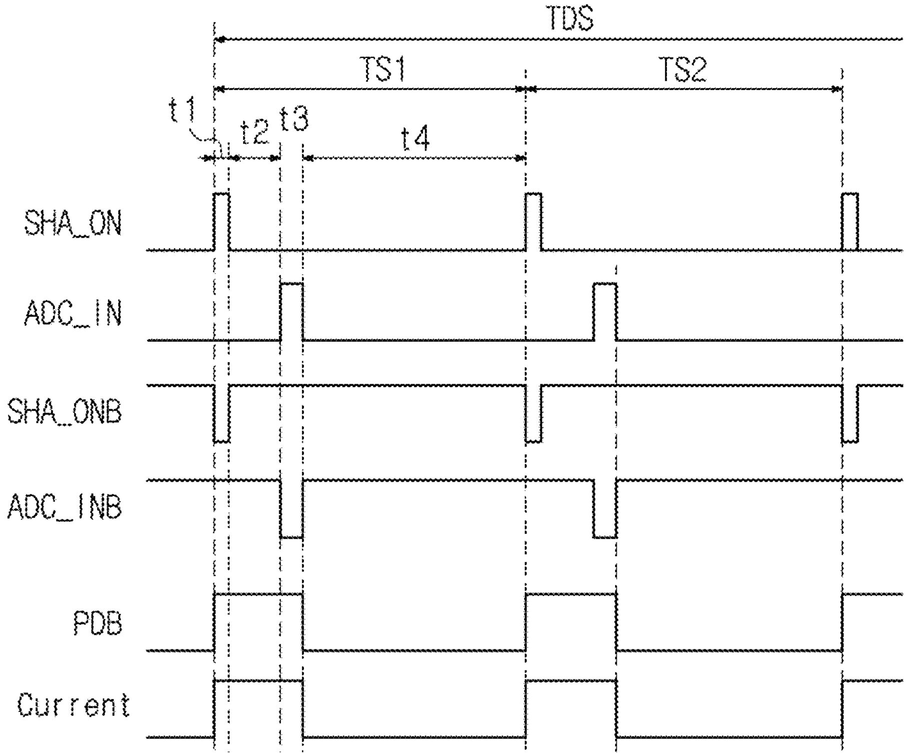
FIG. 9 is a timing diagram illustrating the input and output signals of the power controller in FIG. 8.

FIG. 9 is a timing diagram illustrating the input and output signals of the power controller in FIG. 8.

Referring to FIG. 9, in the first period t1 of each touch sensing period (TS1, TS2), the on-clock signal SHA_ON may be applied at the turn-on level, i.e., high level. Then, through the NOT gate, a low-level inverted signal SHA-_ONB may be input to the reset terminal RST of the flip-flop. As a result, the output signal of the flip-flop is reset to a high level, and a high-level drive control signal PDB may be output to the output terminal Q.

In the second period t2, the on-clock signal SHA_ON transitions to the turn-off level, i.e., low level. Since the flip-flop is configured to respond only to the turn-on level of the on-clock signal SHA_ON, the on-clock signal SHA_ON output to the output terminal Q remains at a high level.

In the third period t3, the ADC input signal ADC_IN is applied at the turn-on level. Then, through the NOT gate, a low-level inverted signal ADC_INB may be input to the clock input terminal CLK of the flip-flop. The flip-flop is configured as a rising edge trigger, responding only to the rising edge of the clock signal, and thus the on-clock signal SHA_ON output to the output terminal Q remains at a high level.

In the fourth period t4, the ADC input signal ADC_IN is applied at the turn-off level. Then, through the NOT gate, a high-level inverted signal ADC_INB may be input to the clock input terminal CLK. The flip-flop, synchronized to the rising edge of the clock signal, may output a low-level logic signal input to the input terminal D to the output terminal Q. Accordingly, a low-level drive control signal PDB may be output to the output terminal Q.

In this manner, the calculation unit PCTRL may generate a drive control signal PDB, synchronized to the rising edge of the on-clock signal SHA_ON and falling to the falling edge of the ADC input signal ADC_IN.

However, the configuration of the calculation unit PCTRL is not limited to the one shown. The calculation unit PCTRL may be constructed with various types of logic circuits to generate the aforementioned form of drive control signal PDB. In various embodiments, the calculation unit PCTRL may be configured as an analog circuit or a digital circuit.

Figure 10:
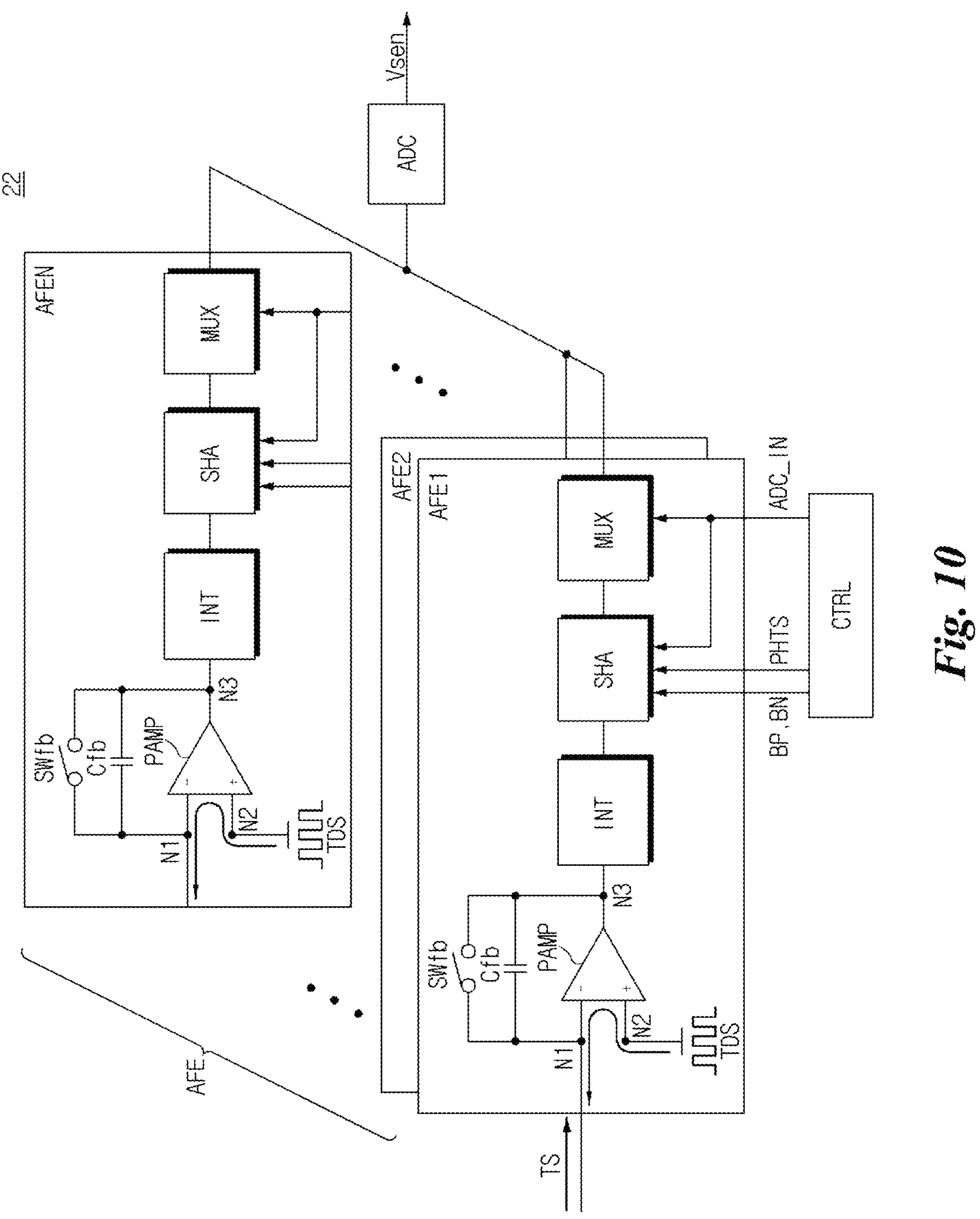
FIG. 10 is a block diagram illustrating the configuration of a touch driving circuit according to the third embodiment.

FIG. 10 is a block diagram illustrating the configuration of a touch driving circuit according to the third embodiment.

Referring to FIG. 10, in the touch drive circuit 22 according to the third embodiment, the sample-and-hold circuit SHA may be configured to receive the ADC input signal ADC_IN provided to the multiplexer circuit MUX.

The ADC input signal ADC_IN may be applied to the multiplexer circuit MUX to define the timing at which the sampling signal is output from the sample-and-hold circuit SHA to the analog-to-digital converter ADC. When the ADC input signal ADC_IN is turned on, the sampling signal held in the sample-and-hold circuit SHA may be output to the ADC.

The sample-and-hold circuit SHA may be configured to have variable output performance based on the ADC input signal ADC_IN. Specifically, when the ADC input signal ADC_IN is turned on, the output terminal of the sample-and-hold circuit SHA is electrically connected to the analog-to-digital converter ADC, so the load of the sample-and-hold circuit SHA may increase. Therefore, the sample-and-hold circuit SHA may be controlled to increase output performance (e.g., to its maximum) while the ADC input signal ADC_IN is applied at the turn-on level.

On the other hand, when the ADC input signal ADC_IN is turned off, the analog-to-digital converter ADC is electrically disconnected from the output terminal of the sample-and-hold circuit SHA, and the load of the sample-and-hold circuit SHA may decrease. Therefore, the sample-and-hold circuit SHA may be controlled to decrease output performance (e.g., to its minimum) while the ADC input signal ADC_IN is applied at the turn-off level.

The output performance of the sample-and-hold circuit SHA may be controlled by adjusting the size of the reference current applied to the sample-and-hold circuit SHA. The size of the reference current may be varied by adjusting the circuit elements, such as transistors, provided in the sample-and-hold circuit SHA, for example, by controlling the channel size of the transistors. The channel size of the transistors may be controlled by adjusting the number of transistors connected to a specific terminal of the sample-and-hold circuit SHA.

Hereinafter, the configuration details of the sample-and-hold circuit SHA with variable output performance will be described.

Figure 11:
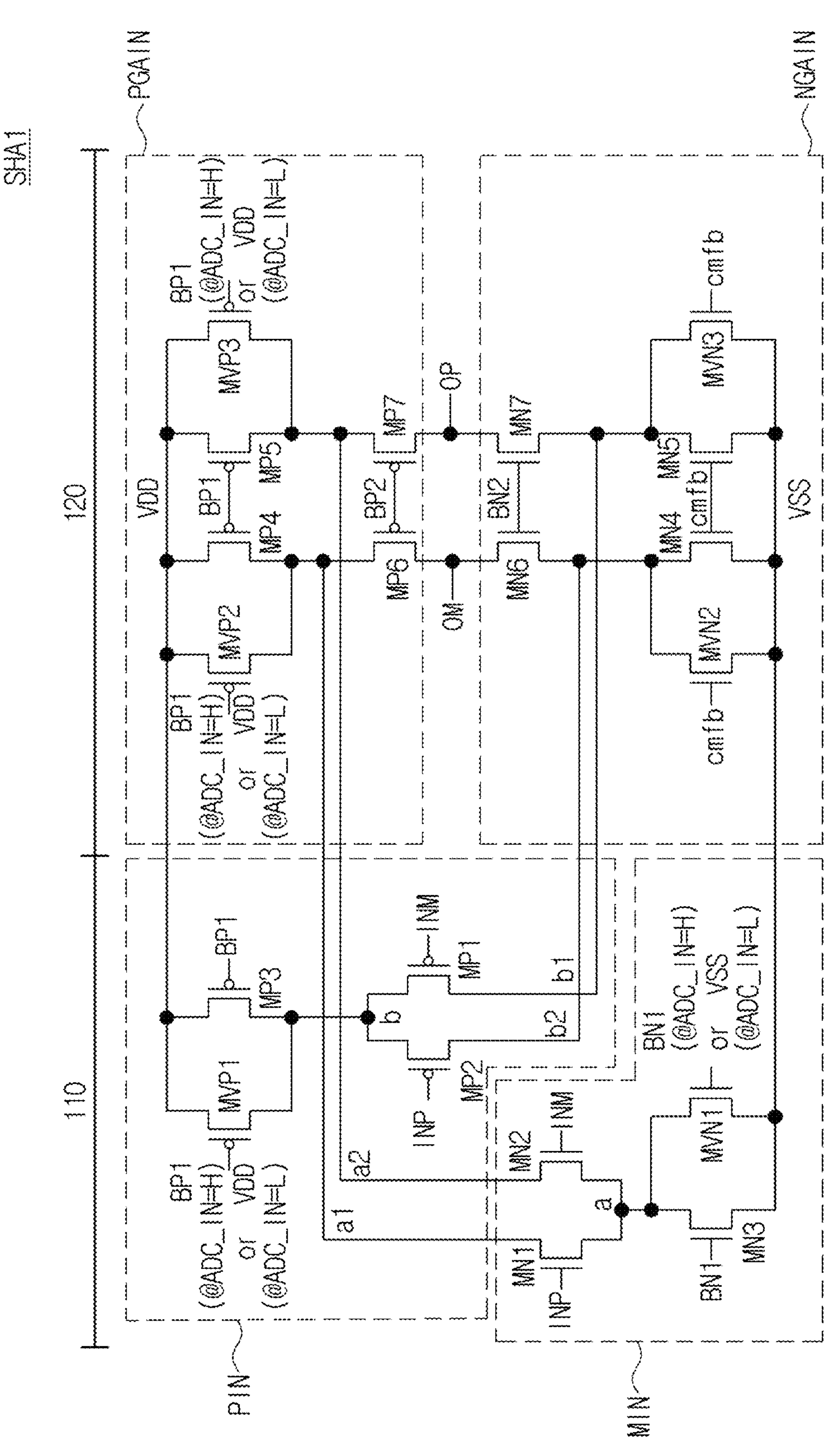
FIG. 11 is a circuit diagram illustrating the configuration of a sample-and-hold circuit according to the first embodiment.

FIG. 11 is a circuit diagram illustrating the configuration of a sample-and-hold circuit according to the first embodiment.

Referring to FIG. 11, the sample-and-hold circuit SHA1 according to the first embodiment may include an input section 110 and an amplification section 120.

The input section 110 is connected to the output terminal of the integrator circuit INT (see FIG. 10). The input section 110 may include a first input circuit MIN including multiple N-type transistors MN1, MN2, and MN3 and a second input circuit PIN including multiple P-type transistors MP1, MP2, and MP3.

The first input circuit MIN may include a first and second N-type transistors MN1 and MN2 with the first input signal INM and the second input signal INP applied to their respective gate nodes. Here, the second input signal INP is the output signal of the integrator circuit INT, and the first input signal INM may be the inverted signal of the output signal of the integrator circuit INT. The first and second N-type transistors MN1 and MN2 may be connected in parallel.

Additionally, the first input circuit MIN may include a third N-type transistor MN3, which is turned on/off by a first N-type drive control signal BN1 applied to its gate node and connected between the common node a of the source electrodes of the first and second N-type transistors MN1 and MN2 and the low-potential voltage VSS. The third N-type transistor MN3 may function as a constant current source that applies a constant reference current to the first input circuit MIN, controlled by the first N-type drive control signal BN1.

The output from the drain node a1 of the first N-type transistor MN1 and the output from the drain node a2 of the second N-type transistor MN2 may be input to the first differential input terminal of the first control circuit PGAIN.

The second input circuit PIN may include first and second P-type transistors MP1 and MP2, with the first input signal INM and the second input signal INP applied to their respective gate nodes. The first and second P-type transistors MP1 and MP2 may be connected in parallel.

The second input circuit PIN may include a third P-type transistor MP3, which is turned on/off by the first P-type drive control signal BP1 applied to its gate node and connected between the common node b of the source electrodes of the first and second P-type transistors MP1 and MP2 and the high-potential voltage VDD. The third P-type transistor MP3 may operate as a constant current source, providing a constant reference current to the second input circuit PIN, controlled by the first P-type drive control signal BP1.

The output from the drain node b1 of the first P-type transistor MP1 and the output from the drain node b2 of the second P-type transistor MP2 may be input to the second differential input of the second control circuit NGAIN.

The drive control signals BN1 and BP1 applied to the input section 110 may be at a turn-on level voltage.

The amplification section 120 may include a first control circuit PGAIN including multiple P-type transistors MP4, MP5, MP6, and MP7, and a second control circuit NGAIN including multiple N-type transistors MN4, MN5, MN6, and MN7. Both the first control circuit PGAIN and the second control circuit NGAIN may each be implemented in a cascode configuration.

The first control circuit PGAIN may include a pair of P-type transistors MP4 and MP5, which form a first current mirror, and are connected between the high-potential voltage VDD and the first differential input. Additionally, the first control circuit PGAIN may further include a pair of P-type transistors MP6 and MP7, connected in series with the P-type transistors MP4 and MP5, forming a second current mirror.

The pair of P-type transistors MP4 and MP5, which form the first current mirror, are driven by the first P-type drive control signal BP1, while the pair of P-type transistors MP6 and MP7, which form the second current mirror, are driven by the second P-type drive control signal BP2.

The first and second current mirrors adjust the output current based on the differential voltage at the first differential input. Specifically, the current flowing through the second current mirror may be amplified by a predetermined ratio compared to the current flowing through the first input circuit MIN. This predetermined ratio corresponds to the transistor size ratio.

The second control circuit NGAIN may include a pair of N-type transistors MN4 and MN5, forming a third current mirror, which is connected between the low-potential voltage VSS and the second differential input. Additionally, the second control circuit NGAIN may further include a pair of N-type transistors MN6 and MN7, connected in series with the N-type transistors MN4 and MN5, forming a fourth current mirror.

The pair of N-type transistors MN4 and MN5, which form the third current mirror, are driven by the second N-type drive control signal BN2, while the pair of N-type transistors MN6 and MN7, which form the fourth current mirror, are driven by a predetermined common feedback signal cmfb.

The third and fourth current mirrors adjust the output current based on the differential voltage at the second differential input. Specifically, the current flowing through the fourth current mirror may be amplified by a predetermined ratio compared to the current flowing through the second input circuit PIN. This predetermined ratio corresponds to the transistor size ratio.

The drive control signals BP1, BP2, BN1, and BN2 used in the amplification section 120 may be turn-on level voltages.

The current amplified through the amplification section 120 may be output through the output terminals OM and OP. The magnitude of the current output from the amplification section 120 may be determined by the magnitude of the reference current applied to the input section 110 and the amplification section 120 through a constant current source, as well as the size of the transistors present in the input section 110 and the amplification section 120. For example, the reference current I is applied to the first input circuit MIN through the third N-type transistor MN3 of the first input circuit MIN, and the channel sizes of the P-type transistors MP4, MP5, MP6, and MP7 in the first control circuit PGAIN are K times the channel sizes of the N-type transistors MN1 and MN2 in the input section 110 (where K is a natural number greater than or equal to 2). Then, the current flowing through the output terminal via the pull-up transistor MP8 will be K times the reference current I. In this embodiment, the magnitude of the output signal (output current) output to the output terminal may be adjusted by controlling the magnitude of the reference current I and/or the size of the transistors in the amplification section 120.

To achieve this, the sample-and-hold circuit SHA1 may further include at least one variable transistor MVN1, MVN2, MVN3, MVP1, MVP2, and MVP3. The variable transistors MVN1, MVN2, MVN3, MVP1, MVP2, and MVP3 may be connected in parallel with at least one transistor from the input section 110 and the amplification section 120.

For example, the first N-type variable transistor MVN1 may be connected in parallel with the third N-type transistor MN3 in the input section 110. In other words, the first N-type variable transistor MVN1 may be connected between the common node a of the source electrodes of the first and second N-type transistors MN1 and MN2 and the low-potential voltage VSS.

The gate node of the first N-type variable transistor MVN1 may be configured to receive the first N-type drive control signal BN1 or the low-potential voltage VSS. For example, in the embodiment of FIG. 10, when the ADC input signal ADC_IN is at the turn-on level, i.e., high level, the gate node of the first N-type variable transistor MVN1 may receive the first N-type drive control signal BN1, and when the ADC input signal ADC_IN is at the turn-off level, i.e., low level, the gate node of the first N-type variable transistor MVN1 may be configured to receive the low-potential voltage VSS. Since the first N-type drive control signal BN1 is applied at the turn-on level, when the first N-type drive control signal BN1 is applied, the first N-type variable transistor MVN1 turns on, and when the low-potential voltage VSS is applied, the first N-type variable transistor MVN1 turns off.

That is, when the ADC input signal ADC_IN is at a high level, the first N-type variable transistor MVN1 turns on and is connected in parallel with the third N-type transistor MN3. The turn-on first N-type variable transistor MVN1, along with the third N-type transistor MN3, may operate as a constant current source to apply a certain reference current to the first input circuit MIN. Here, the reference current applied to the common node a increases due to the parallel connection of the additional first N-type variable transistor MVN1. The output current of the sample-and-hold circuit SHA1 increases in response to the reference current magnitude. As a result, when the ADC input signal ADC_IN is applied at a high level, the output performance of the sample-and-hold circuit SHA1 can be improved while the circuit is connected to the analog-to-digital converter ADC.

When the ADC input signal ADC_IN is at a low level, the first N-type variable transistor MVN1 is turned off. As a result, the reference current is applied to the first input circuit MIN through the third N-type transistor MN3. The magnitude of the reference current applied in this case is smaller compared to when the first N-type variable transistor MVN1 is connected in parallel. As a result, when the ADC input signal ADC_IN is applied at a low level, causing the sample-and-hold circuit SHA1 to be disconnected from the analog-to-digital converter ADC, the output performance of the sample-and-hold circuit SHA1 may decrease.

The first P-type variable transistor MVP1 may be connected in parallel with the third P-type transistor MP3 of the input section 110. In other words, the first P-type variable transistor MVP1 may be connected between the common node b of the source electrodes of the first and second P-type transistors MP1 and MP2 and the high voltage VDD.

The gate node of the first P-type variable transistor MVP1 is configured to receive the first P-type drive control signal BP1 or the high voltage VDD. For example, in the embodiment of FIG. 10, when the ADC input signal ADC_IN is at the turn-on level, i.e., high level, the gate node of the first P-type variable transistor MVP1 receives the first P-type drive control signal BP1, and when the ADC input signal ADC_IN is at the turn-off level, i.e., low level, the gate node of the first P-type variable transistor MVP1 is configured to receive the high voltage VDD. The first P-type drive control signal BP1 is applied at the turn-on level, so when the first P-type drive control signal BP1 is applied, the first P-type variable transistor MVP1 is turned on, and when the low voltage VSS is applied, the first P-type variable transistor MVP1 is turned off.

That is, when the ADC input signal ADC_IN is at the high level, the first P-type variable transistor MVP1 is turned on and connected in parallel with the third P-type transistor MP3. The turned-on first P-type variable transistor MVP1, together with the third P-type transistor MP3, operates as a constant current source that applies a constant reference current to the second input circuit MIP. Here, the size of the reference current applied to the common node b increases due to the parallel connection of the first P-type variable transistor MVP1. The output current of the sample-and-hold circuit SHA1 increases in response to the reference current magnitude. As a result, when the ADC input signal ADC_IN is applied at a high level, the output performance of the sample-and-hold circuit SHA1 can be improved while the circuit is connected to the analog-to-digital converter ADC.

When the ADC input signal ADC_IN is at the low level, the first P-type variable transistor MVP1 is turned off. Accordingly, the reference current is applied to the second input circuit MIP through the third P-type transistor MP3. The magnitude of the applied constant current decreases compared to when the first P-type variable transistor MVP1 is connected in parallel. As a result, when the ADC input signal ADC_IN is applied at a low level, causing the sample-and-hold circuit SHA1 to be disconnected from the analog-to-digital converter ADC, the output performance of the sample-and-hold circuit SHA1 may decrease.

The second N-type variable transistor MVN2 and the third N-type variable transistor MVN3 may be connected in parallel with the N-type transistors MN4 and MN5, which form the third current mirror of the second control circuit NGAIN. That is, the second N-type variable transistor MVN2 may be connected between the second differential input terminal and the low voltage VSS, and the third N-type variable transistor MVN3 may also be connected between the second differential input terminal and the low voltage VSS.

The gate nodes of the second N-type variable transistor MVN2 and the third N-type variable transistor MVN3 are configured to receive a common feedback signal cmfb. When the common feedback signal cmfb is applied at the turn-on level, the second N-type variable transistor MVN2 and the third N-type variable transistor MVN3 are turned on, and when the common feedback signal cmfb is applied at the turn-off level, the second N-type variable transistor MVN2 and the third N-type variable transistor MVN3 are turned off.

The second N-type variable transistor MVN2 and the third N-type variable transistor MVN3, when turned on, are connected in parallel with the fourth N-type transistor MN4 and the fifth N-type transistor MN5, respectively. The turned-on second N-type variable transistor MVN2 and third N-type variable transistor MVN3, together with the fourth and fifth N-type transistors MN4 and MN5, can control the magnitude of the current flowing to the output terminal. In this case, the magnitude of the current applied to the output terminal increases due to the parallel connection of the second N-type variable transistor MVN2 and the third N-type variable transistor MVN3. The output current of the sample-and-hold circuit SHA1 increases in correspondence with the magnitude of the current output from the second control circuit NGAIN. As a result, the output performance of the sample-and-hold circuit SHA1 can be improved.

When the second N-type variable transistor MVN2 and the third N-type variable transistor MVN3 are turned off, the magnitude of the output current of the second control circuit NGAIN may be controlled through the fourth and fifth N-type transistors MN4 and MN5. At this time, the magnitude of the output current decreases compared to when the second N-type variable transistor MVN2 and the third N-type variable transistor MVN3 are connected in parallel. As a result, the output performance of the sample-and-hold circuit SHA1 can be reduced.

The second P-type variable transistor MVP2 and the third P-type variable transistor MVP3 may be connected in parallel with the P-type transistors MP4 and MP5 that form the first current mirror of the first control circuit PGAIN. That is, the second P-type variable transistor MVP2 may be connected between the first differential input terminal and the high voltage VDD, and the third P-type variable transistor MVP3 may also be connected between the first differential input terminal and the high voltage VDD.

The gate nodes of the second P-type variable transistor MVP2 and the third P-type variable transistor MVP3 are configured to receive the first P-type drive control signal BP1 or the high voltage VDD. For example, in the embodiment of FIG. 10, when the ADC input signal ADC_IN is at the turn-on level, i.e., high level, the gate nodes of the second P-type variable transistor MVP2 and the third P-type variable transistor MVP3 receive the first P-type drive control signal BP1, and when the ADC input signal ADC_IN is at the turn-off level, i.e., low level, the gate nodes of the second P-type variable transistor MVP2 and the third P-type variable transistor MVP3 may be configured to receive the high voltage VDD. The first P-type drive control signal BP1 is applied at the turn-on level, so when the first P-type drive control signal BP1 is applied, the second P-type variable transistor MVP2 and the third P-type variable transistor MVP3 are turned on, and when the high voltage VDD is applied, the second P-type variable transistor MVP2 and the third P-type variable transistor MVP3 are turned off.

That is, when the ADC input signal ADC_IN is at the high level, the second P-type variable transistor MVP2 and the third P-type variable transistor MVP3 are turned on and connected in parallel with the fourth P-type transistor MP4 and the fifth P-type transistor MP5. The turned-on second P-type variable transistor MVP2 and third P-type variable transistor MVP3, along with the fourth and fifth P-type transistors MP4 and MP5, can control the magnitude of the current flowing to the output terminal. At this time, the magnitude of the current applied to the output terminal is increased by the additional parallel connection of the second P-type variable transistor MVP2 and the third P-type variable transistor MVP3. The output current of the sample-and-hold circuit SHA1 increases in response to the magnitude of the current output from the first control circuit PGAIN. As a result, when the ADC input signal ADC_IN is applied at a high level, the output performance of the sample-and-hold circuit SHA1 can be improved while the circuit is connected to the analog-to-digital converter ADC.

When the ADC input signal ADC_IN is at the low level, the second P-type variable transistor MVP2 and the third P-type variable transistor MVP3 are turned off. Consequently, the magnitude of the output current from the first control circuit PGAIN can be controlled through the fourth and fifth P-type transistors MP4 and MP5. In this case, the magnitude of the output current decreases compared to when the second P-type variable transistor MVP2 and the third P-type variable transistor MVP3 are connected in parallel. As a result, when the ADC input signal ADC_IN is applied at a low level, causing the sample-and-hold circuit SHA1 to be disconnected from the analog-to-digital converter ADC, the output performance of the sample-and-hold circuit SHA1 may decrease.

As described above, in the sample-and-hold circuit SHA1 according to the first embodiment, the size of the channels of the transistors and the output current within the circuit vary in response to the ADC input signal ADC_IN during operation. The increase or decrease in the output current of the sample-and-hold circuit SHA1 results in changes in power consumption, so the power consumption of the sample-and-hold circuit SHA1 can be varied by the ADC input signal ADC_IN. When the ADC input signal ADC_IN turns on, increasing the load of the sample-and-hold circuit SHA1, the output performance of the circuit improves, allowing the required output current to be delivered, while when the ADC input signal ADC_IN turns off, reducing the load, the input current and corresponding power consumption within the sample-and-hold circuit SHA1 decrease, preventing unnecessary power consumption.

Figure 12:
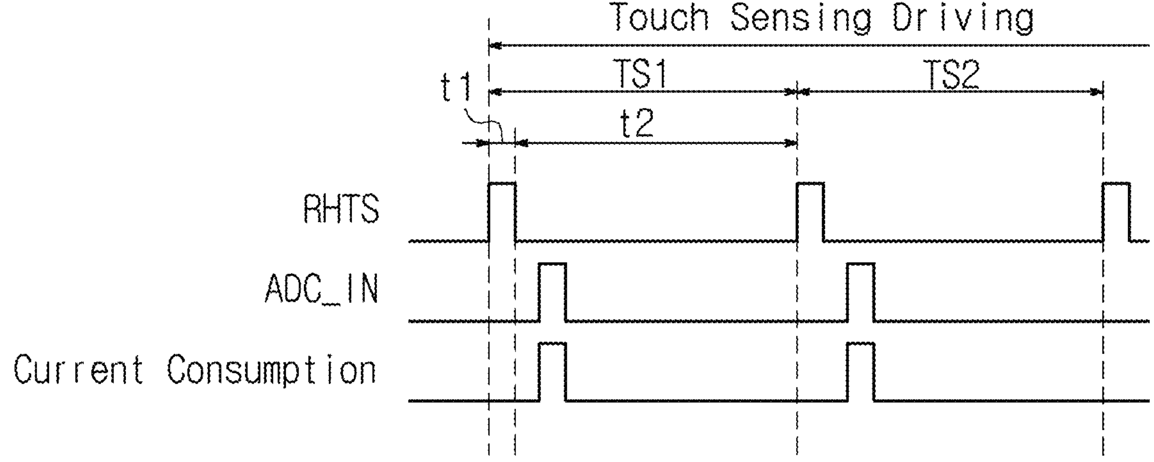
FIG. 12 is a timing diagram illustrating the input and output signals generated in the touch driving circuit equipped with the sample-and-hold circuit of FIG. 11.

FIG. 12 is a timing diagram illustrating the input and output signals generated in the touch driving circuit equipped with the sample-and-hold circuit of FIG. 11.

Referring to FIGS. 11 and 12, during the touch sensing driving TSD, one or more touch sensing periods TS1 and TS2 may be performed. Touch sensing may be performed for the sensing units corresponding to each touch sensing period (TS1 and TS2).

During the first period t1 of each touch sensing period (TS1 and TS2), a clock signal PHTS at the turn-on level may be output from the controller CTRL.

The sample-and-hold circuit SHA of the analog front-end circuits AFE may initiate sampling in response to the pulse of the clock signal PHTS and process the touch sensing signal TS input from the touch electrodes TE (FIG. 2) to generate the sampling signal. After the first period t1, the analog front-end circuits AFE may hold the generated sampling signal.

During the first period t1, the variable transistors MVN1, MVN2, MVN3, MVP1, MVP2, and MVP3 of the sample-and-hold circuit SHA are turned off. As a result, the current consumption of the sample-and-hold circuit SHA decreases.

Subsequently, during the second period t2, the controller CTRL may apply a turn-on level ADC input signal ADC_IN to the analog front-end circuits AFE. As a result, current may be output from the sampling and hold circuit SHA to the analog-to-digital converter ADC.

During the second period t2, the variable transistors MVN1, MVN2, MVN3, MVP1, MVP2, and MVP3 within the sampling and hold circuit SHA are turned on in response to the turn-on level ADC input signal ADC_IN. As a result, the variable transistors MVN1, MVN2, MVN3, MVP1, MVP2, and MVP3 are connected in parallel to the corresponding nodes of the input section 110 and amplification section 120 of the sample-and-hold circuit SHA, increasing the amount of current supplied to the sample-and-hold circuit SHA. Consequently, the consumption current of the sample-and-hold circuit SHA increases, and the magnitude of the output current from the sample-and-hold circuit SHA increases, thereby improving its output performance.

Figure 13:
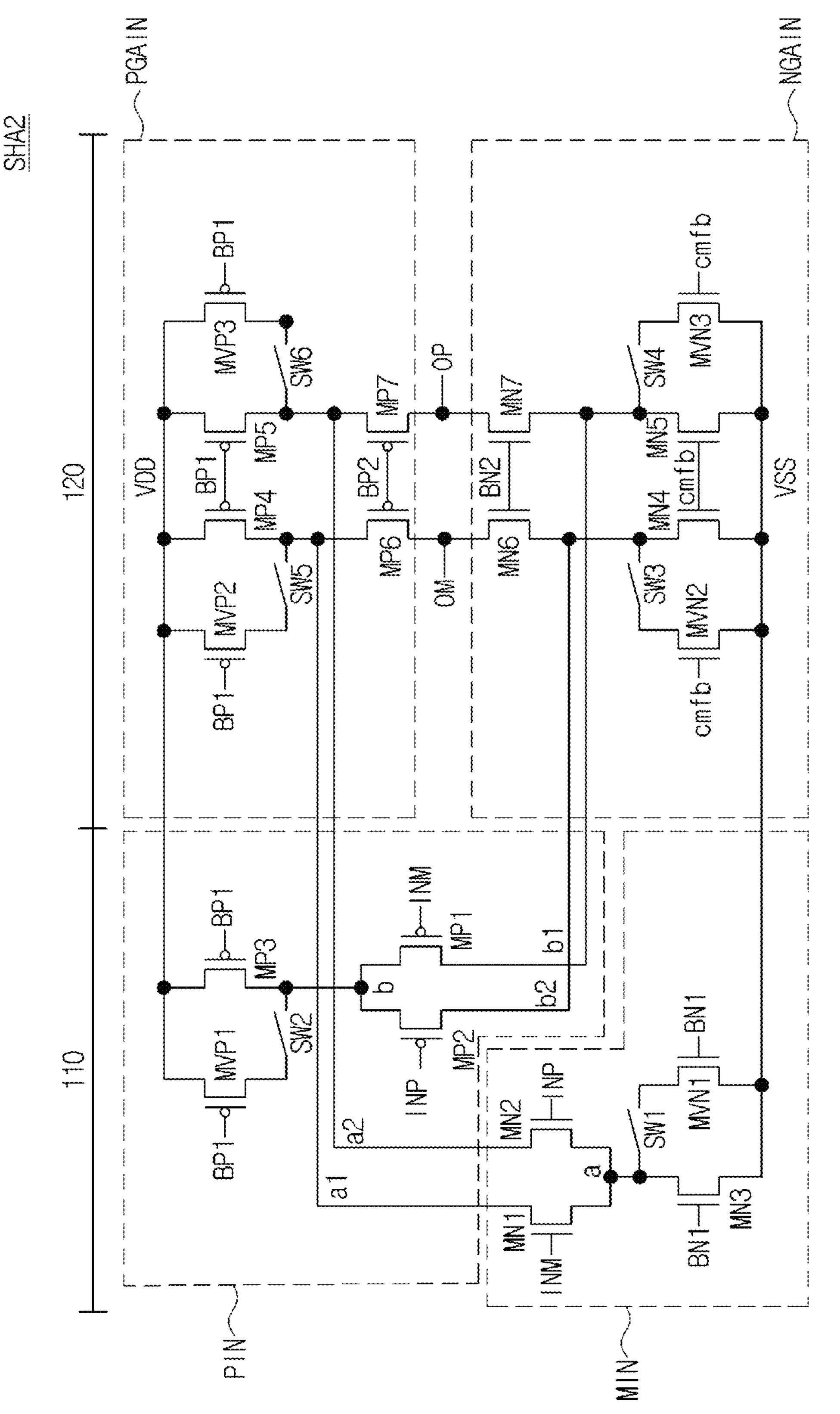
FIG. 13 is a circuit diagram illustrating the configuration of a sample-and-hold circuit according to the second embodiment.

FIG. 13 is a circuit diagram illustrating the configuration of a sample-and-hold circuit according to the second embodiment.

Compared to the embodiment of FIG. 11, the sample-and-hold circuit SHA2 according to the embodiment of FIG. 13 includes at least one of variable transistors MVN1, MVN2, MVN3, MVP1, MVP2, and MVP3 and switching elements SW1, SW2, SW3, SW4, SW5, and SW6 connected to the variable transistors MVN1, MVN2, MVN3, MVP1, MVP2, and MVP3.

The first N-type variable transistor MVN1 and the first switching element SW1 may be connected in series between the common node a of the source electrodes of the first and second N-type transistors MN1 and MN2 and the low-potential voltage VSS. The gate node of the first N-type variable transistor MVN1 may be configured to receive the first N-type drive control signal BN1.

The first P-type variable transistor MVP1 and the second switching element SW2 may be connected in series between the common node b of the source electrodes of the first and second P-type transistors MP1 and MP2 and the high-potential voltage VDD. The gate node of the first P-type variable transistor MVP1 may be configured to receive the first P-type drive control signal BP1.

The second N-type variable transistor MVN2 and the third switching element SW3 may be connected in series between the second differential input terminal and the low-potential voltage VSS. The third N-type variable transistor MVN3 and the fourth switching element SW4 may be connected in series between the second differential input terminal and the low-potential voltage VSS. The gate nodes of the second N-type variable transistor MVN2 and the third N-type variable transistor MVN3 may be configured to receive the first N-type drive control signal BN1.

The second P-type variable transistor MVP2 and the fifth switching element SW5 may be connected in series between the first differential input terminal and the high-potential voltage VDD. The third P-type variable transistor MVP3 and the sixth switching element SW6 may be connected in series between the first differential input terminal and the high-potential voltage VDD. The gate nodes of the second P-type variable transistor MVP2 and the third P-type variable transistor MVP3 may be configured to receive the first P-type drive control signal BP1.

The switching elements SW1, SW2, SW3, SW4, SW5, and SW6 may be turned on/off by the ADC input signal ADC_IN. For example, when a high-level ADC input signal ADC_IN, i.e., at the turn-on level, is input the switching elements SW1, SW2, SW3, SW4, SW5, and SW6 are turned on, and when a low-level ADC input signal ADC_IN, i.e., at the turn-off level, is input, the switching elements SW1, SW2, SW3, SW4, SW5, and SW6 may be turned off.

When the switching elements SW1, SW2, SW3, SW4, SW5, and SW6 are turned on, the variable transistors MVN1, MVN2, MVN3, MVP1, MVP2, and MVP3 may be electrically connected to the input section 110 or amplification section 120, and when the switching elements SW1, SW2, SW3, SW4, SW5, and SW6 are turned off, the variable transistors MVN1, MVN2, MVN3, MVP1, MVP2, and MVP3 may be electrically disconnected from the input section 110 or amplification section 120. As the variable transistors MVN1, MVN2, MVN3, MVP1, MVP2, and MVP3 are connected or disconnected, the input current to the sample-and-hold circuit SHA2, the output current generated from the input current, and the resulting power consumption may vary.

Figure 14:
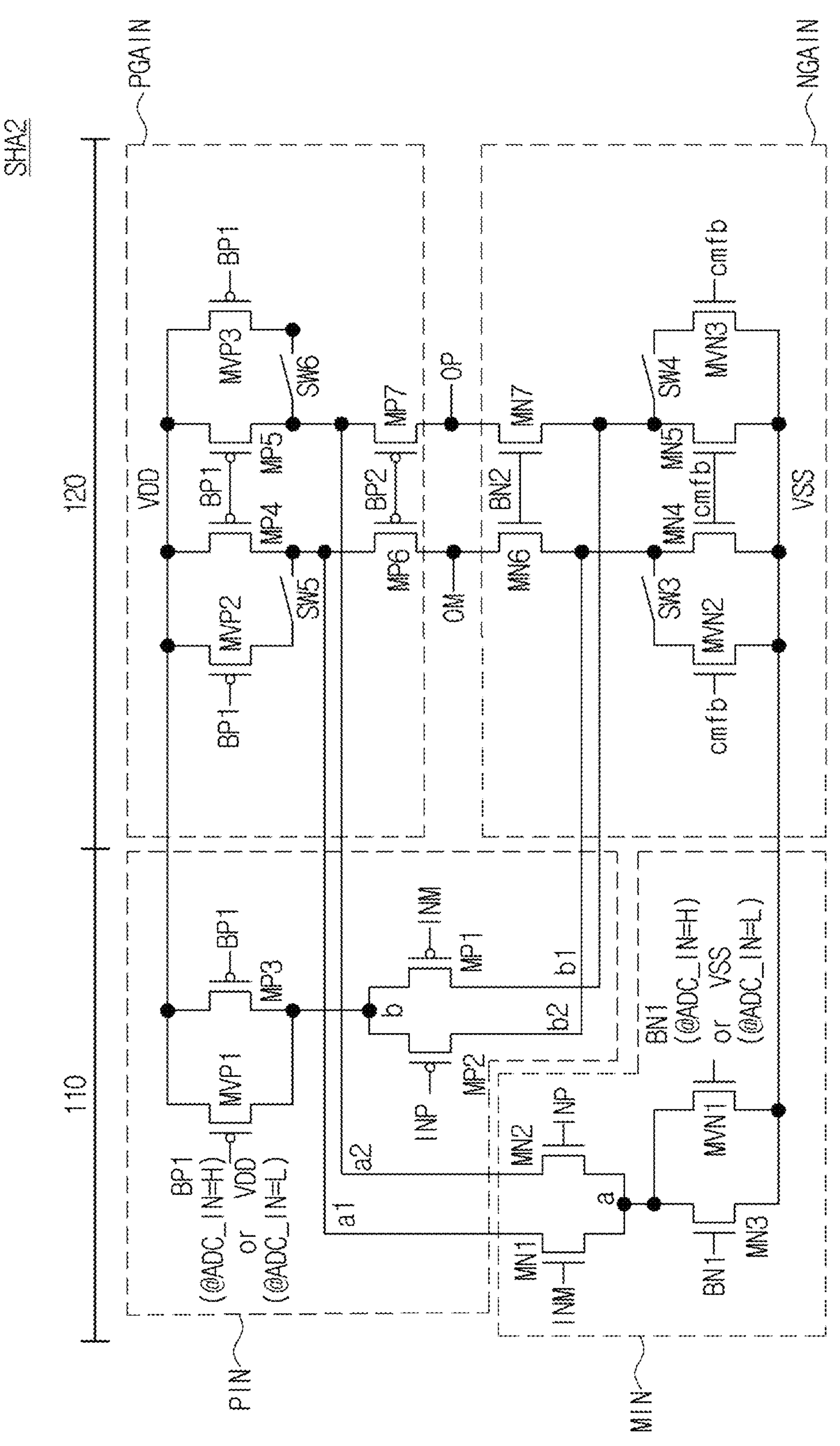
FIG. 14 is a circuit diagram illustrating the configuration of a sample-and-hold circuit according to the third embodiment.

FIG. 14 is a circuit diagram illustrating the configuration of a sample-and-hold circuit according to the third embodiment.

The sample-and-hold circuit SHA3 according to the embodiment of FIG. 14 differs from those in the embodiments of FIGS. 11 and 13 in that at least some of the variable transistors MVN1, MVN2, MVN3, MVP1, MVP2, and MVP3 have their internal connections within SHA3 controlled by signals applied to their gate nodes, while the remaining transistors have their internal connections controlled by switching elements SW3, SW4, SW5, and SW6.

For example, in the illustrated embodiment, the first N-type variable transistor MVN1 and the first P-type variable transistor MVP1 have their connections to the input section 110 controlled by signals applied to their gate nodes, while the second and third N-type variable transistors MVN2 and MVN3 and the second and third P-type variable transistors MVP2 and MVP3 have their connections to the amplification section 120 controlled through switching elements SW3, SW4, SW5, and SW6. However, this embodiment is not limited to this configuration. In various embodiments, the variable transistors MVN1 and MVP1 connected to the input section 110 may have their connections and disconnections controlled through switching elements, while the variable transistors MVN2, MVN3, MVP2, and MVP3 connected to the amplification section 120 may have their connections and disconnections controlled by signals applied to their gate nodes. Alternatively, some of the variable transistors MVN1 and MVP1 connected to the input section 110 may have their connections and disconnections controlled by signals applied to their gate nodes, while the remaining ones may have their connections and disconnections controlled through switching elements. Similarly, some of the variable transistors MVN2, MVN3, MVP2, and MVP3 connected to the amplification section 120 may have their connections and disconnections controlled by signals applied to their gate nodes, while the others may have their connections and disconnections controlled through switching elements.

The input sensing device and the display device including the same, according to the embodiments, are advantageous for reducing power consumption during touch sensing operation by activating the sample-and-hold circuit of the input sensing device only for the period that is practically required.

The input sensing device and the display device including the same, according to the embodiments, are also advantageous for preventing performance degradation of circuit components and extending their lifespan by varying the performance of the sample-and-hold circuit.

The input sensing device and the display device including the same, according to the embodiments, are also advantageous for reducing product costs by lowering power consumption without increasing circuit complexity or manufacturing costs.

Although embodiments of this disclosure have been described above with reference to the accompanying drawings, it will be understood that the technical configuration of this disclosure described above can be implemented in other specific forms by those skilled in the art without changing the technical concept or essential features of the present disclosure. Therefore, it should be understood that the embodiments described above are exemplary and not limited in all respects. In addition, it should be understood that all modifications or variations derived from the meaning and scope of the claims and their equivalent concept are included within the scope of the this disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An input sensing device comprising:

a plurality of analog front-end circuits configured to process touch sensing signals output from a plurality of touch electrodes to generate a sampling signal; and an analog-to-digital converter (ADC) configured to convert the sampling signal to generate sensing data, wherein each of the plurality of analog front-end circuits comprises:

a pre-amplifier configured to amplify the touch sensing signals and output an amplified signal;

an integration circuit configured to integrate the amplified signal output from the pre-amplifier and generate an integrated signal;

a sample-and-hold circuit configured to sample the integrated signal and generate the sampling signal; and a multiplexer circuit configured to electrically connect an output terminal of the sample-and-hold circuit and an input terminal of the ADC in response to an ADC input signal at a turn-on level, the ADC input signal for controlling an amount of a reference current.

2. The input sensing device of claim 1, further comprising:

a controller configured to output a clock signal for controlling the operation timing of the sample-and-hold circuit, an on-clock signal for controlling the turn-on of the sample-and-hold circuit, and the ADC input signal; and a calculation unit configured to apply a driving control signal to the sample-and-hold circuit based on the on-clock signal and the ADC input signal.

3. The input sensing device of claim 2, wherein the driving control signal is configured to rise to a turn-on level in synchronization with the rising edge of the on-clock signal, and to fall to a turn-off level in synchronization with the falling edge of the ADC input signal.

4. The input sensing device of claim 3, wherein the reference current is applied to the sample-and-hold circuit in response to the driving control signal at the turn-on level, and is stopped from being applied to the sample-and-hold circuit in response to the driving control signal at the turn-off level.

5. The input sensing device of claim 3, wherein during a touch sensing period, after the on-clock signal is applied at the turn-on level, the clock signal is applied at the turn-on level, and after the clock signal transitions to a turn-off level, the ADC input signal is applied at a turn-on level.

6. The input sensing device of claim 5, wherein the sample-and-hold circuit is configured to be turned on in response to the driving control signal at the turn-on level, generate the sampling signal in response to the clock signal at the turn-on level, hold the sampling signal in response to the clock signal at the turn-off level, and output the sampling signal to the ADC in response to the ADC input signal at the turn-on level.

7. The input sensing device of claim 2, wherein the calculation unit comprises a flip-flop, wherein the flip-flop comprises:

an input terminal configured to receive a low-level logic signal, a reset terminal configured to receive an inverted signal of the on-clock signal, a clock input terminal configured to receive an inverted signal of the ADC input signal; and an output terminal configured to output the driving control signal.

8. The input sensing device of claim 7, wherein the flip-flop is configured to output the driving control signal at a high-level at the output terminal in response to the inverted signal at a low-level of the on-clock signal being input to the reset terminal, and output the low-level logic signal at the output terminal in response to the inverted signal of the ADC input signal transitioning from low level to high level at the clock input terminal.

9. The input sensing device of claim 1, wherein the sample-and-hold circuit is configured to be turned on or turned off based on the ADC input signal, and comprises at least one variable transistor configured to control the amount of the reference current.

10. The input sensing device of claim 9, wherein the at least one variable transistor is configured to receive a driving control signal at a turn-on level or a voltage at a turn-off level in response to the ADC input signal.

11. The input sensing device of claim 10, wherein the sample-and-hold circuit comprises:

an input section configured to receive the integrated signal and apply the reference current in response to the driving control signal;

a control section including current mirrors configured to amplify the integrated signal based on the reference current; and an output section configured to output the sampling signal based on a current output from the control section, wherein the at least one variable transistor is connected in parallel with at least one transistor in the input section or the control section.

12. The input sensing device of claim 11, wherein the sample-and-hold circuit further comprises a switching element connected in series with the at least one variable transistor and configured to turn on in response to the ADC input signal.

13. A display device comprising:

a touch panel comprising a plurality of touch electrodes; and a touch driving circuit configured to process touch sensing signals output from the plurality of touch electrodes to generate a sampling signal, wherein the touch driving circuit comprises:

a plurality of analog front-end circuits configured to process the touch sensing signals output from the plurality of touch electrodes and generate the sampling signal;

an analog-to-digital converter ADC configured to convert the sampling signal and generate sensing data; and a controller configured to control the operation timing of the plurality of analog front-end circuits, wherein each of the plurality of analog front-end circuits comprises:

a pre-amplifier configured to amplify the touch sensing signals and output an amplified signal;

an integration circuit configured to integrate the amplified signal output from the pre-amplifier to generate an integrated signal;

a sample-and-hold circuit configured to sample the integrated signal to generate the sampling signal; and a multiplexer circuit configured to electrically connect an output terminal of the sample-and-hold circuit and an input terminal of the ADC in response to a ADC input signal at a turn-on level.

14. The display device of claim 13, wherein the controller is configured to output a clock signal for controlling the operation timing of the sample-and-hold circuit, an on-clock signal for controlling the turn-on of the sample-and-hold circuit, and the ADC input signal, and each of the plurality of analog front-end circuits further comprises an calculation unit configured to apply a driving control signal to the sample-and-hold circuit based on the on-clock signal and the ADC input signal.

15. The display device of claim 14, wherein the driving control signal is configured to rise to a turn-on level in synchronization with the rising edge of the on-clock signal, and fall to a turn-off level in synchronization with the falling edge of the ADC input signal.

16. The display device of claim 15, wherein the ADC input signal controls the amount of a reference current, and the reference current is applied to the sample-and-hold circuit in response to the driving control signal at the turn-on level, and is stopped from being applied to the sample-and-hold circuit in response to the driving control signal at the turn-off level.

17. The display device of claim 14, wherein the calculation unit comprises a flip-flop comprising:

an input terminal configured to receive a low-level logic signal;

a reset terminal configured to receive an inverted signal of the on-clock signal;

a clock input terminal configured to receive an inverted signal of the ADC input signal; and an output terminal configured to output the driving control signal.

18. The display device of claim 13, wherein the sample-and-hold circuit comprises:

an input section configured to receive the integrated signal and apply a reference current in response to a driving control signal;

a control section including current mirrors configured to amplify the integrated signal based on the reference current;

an output section configured to output the sampling signal based on a current output from the control section; and at least one variable transistor connected in parallel with at least one transistor in the input section and the control section.

19. The display device of claim 18, wherein the at least one variable transistor is configured to receive the driving control signal at a turn-on level or a voltage at a turn-off level in response to the ADC input signal.

20. The display device of claim 18, wherein the at least one variable transistor is connected in series with a switching element to be turned on in response to the ADC input signal.

* * * * *